US011323920B2

(12) United States Patent
Shi et al.

(10) Patent No.: US 11,323,920 B2
(45) Date of Patent: May 3, 2022

(54) HANDOVER METHOD, BASE STATION, AND COMMUNICATIONS SYSTEM

(71) Applicant: Huawei Technologies Co., Ltd., Shenzhen (CN)

(72) Inventors: Xiaoli Shi, Shanghai (CN); Mingzeng Dai, Shanghai (CN); Hongzhuo Zhang, Shanghai (CN); Qinghai Zeng, Shanghai (CN); Rui Wang, Shanghai (CN); Yi Guo, Shenzhen (CN); Lei Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 18 days.

(21) Appl. No.: 16/254,829

(22) Filed: Jan. 23, 2019

(65) Prior Publication Data

US 2019/0159088 A1      May 23, 2019

Related U.S. Application Data

(63) Continuation of application No. PCT/CN2017/097221, filed on Aug. 11, 2017.

(30) Foreign Application Priority Data

Aug. 12, 2016   (CN) .......................... 201610666011.2

(51) Int. Cl.
*H04W 36/12*        (2009.01)
*H04W 36/00*        (2009.01)
(Continued)

(52) U.S. Cl.
CPC ... *H04W 36/0005* (2013.01); *H04W 36/0061* (2013.01); *H04W 36/08* (2013.01);
(Continued)

(58) Field of Classification Search
CPC . H04W 36/12; H04W 36/00; H04W 36/0061; H04W 36/38; H04W 36/08;
(Continued)

(56) References Cited

U.S. PATENT DOCUMENTS 8,971,290 B2   3/2015  Liang et al.
9,408,113 B2   8/2016  Keller et al.
(Continued)

FOREIGN PATENT DOCUMENTS

CN      101132612 A     2/2008
CN      101355796 A     1/2009
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.4.0, Jun. 2016, 310 pages.
(Continued)

*Primary Examiner* — Peter P Chau
(74) *Attorney, Agent, or Firm* — Slater Matsil, LLP

(57) ABSTRACT

A handover method, including sending, by a source base station to a source core network device in a process of handing user equipment (UE) over from the source base station to a target base station, a handover required message. The message comprises identification information of a target core network device, and the identification information of the target core network device instructs the source core network device to perform a core network relocation process with the target core network device. The source base station is connected to the source core network device, and the target base station is connected to both the source core network device and the target core network device.

18 Claims, 6 Drawing Sheets

(51) Int. Cl.
*H04W 36/08* (2009.01)
*H04W 36/38* (2009.01)

(52) U.S. Cl.
CPC .......... *H04W 36/12* (2013.01); *H04W 36/38* (2013.01); *H04W 36/0022* (2013.01)

(58) Field of Classification Search
CPC ......... H04W 36/0022; H04W 36/0066; H04W 36/14
See application file for complete search history.

(56) References Cited

U.S. PATENT DOCUMENTS

| | | | |
|---|---|---|---|
| 2009/0086691 A1* | 4/2009 | Balasubramanian | H04W 60/00 370/338 |
| 2010/0027468 A1* | 2/2010 | Rajadurai | H04W 48/12 370/328 |
| 2010/0056156 A1* | 3/2010 | Xu | H04L 9/14 455/436 |
| 2013/0044709 A1* | 2/2013 | Adjakple | H04W 76/15 370/329 |
| 2014/0051393 A1* | 2/2014 | Mildh | H04W 48/18 455/411 |
| 2014/0051445 A1 | 2/2014 | Vikberg et al. | |
| 2014/0204908 A1 | 7/2014 | Keller et al. | |
| 2014/0301370 A1* | 10/2014 | Sivavakeesar | H04W 36/0005 370/331 |
| 2016/0270142 A1* | 9/2016 | Olsson | H04W 8/18 |
| 2017/0289019 A1* | 10/2017 | Faccin | H04L 61/2007 |
| 2018/0027610 A1* | 1/2018 | Werner | H04W 84/045 370/331 |

FOREIGN PATENT DOCUMENTS

| | | |
|---|---|---|
| CN | 101640917 A | 2/2010 |
| CN | 101790216 A | 7/2010 |
| CN | 101959270 A | 1/2011 |
| CN | 102244908 A | 11/2011 |
| CN | 103765844 A | 4/2014 |
| CN | 105338557 A | 2/2016 |
| CN | 105657756 A | 6/2016 |
| KR | 100920546 B1 | 10/2009 |
| WO | 2012031507 A1 | 3/2012 |
| WO | 2018065936 A1 | 4/2018 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331 V13.2.0, Jun. 2016, 623 pages.

"Text Proposal of Evolved LTE," Source: Huawei, Agenda item: 10.2.2, Document for: Approval, 3GPP TSG-RAN3 Meeting #92, R3-161453, May 23-27, 2016, 1 page.

"Inter-system mobility cases," Source: Huawei, Agenda Item: 10.6.2.2, Document for: Discussion, 3GPP TSG-RAN WG3 AH, R3-170229, Jan. 17-19, 2017, 5 pages.

"Telecom Italia vision and requirements on 5G," 3GPPRAN-workshop on 5G, RWS-150041, Sep. 17-18, 2015, 11 pages.

"3rd Generation Partnership Project; Technical Specification Group Radio Access Network; Evolved Universal Terrestrial Radio Access Network (E-UTRAN); S1 Application Protocol (S1AP) (Release 13)," 3GPP TS 36.413 V13.3.0, Jun. 2016, 331 pages.

* cited by examiner

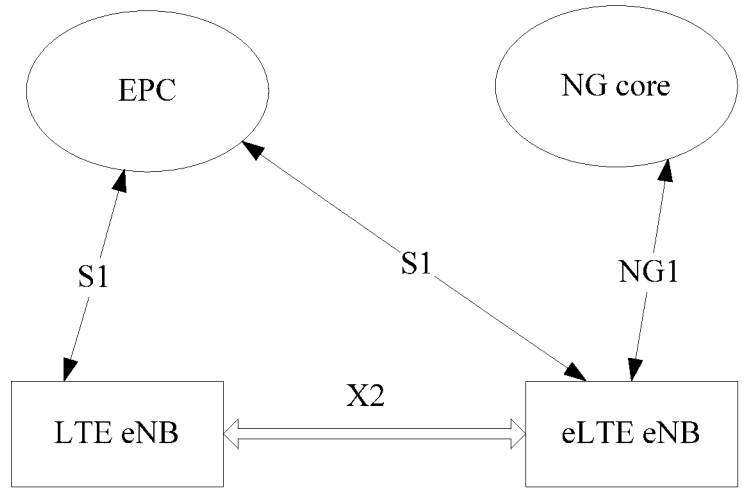

FIG. 1

S201. A source base station determines to hand user equipment UE over to a target base station, where the source base station is connected to a source core network device, and the target base station is connected to both the source core network device and a target core network device S202. The source base station sends a handover required message to the source core network device, where the handover required message includes identification information of the target core network device, and the handover required message is used to instruct the source core network device to perform a core network relocation process with the target core network device

FIG. 2

HANDOVER METHOD, BASE STATION, AND COMMUNICATIONS SYSTEM

CROSS-REFERENCE TO RELATED APPLICATIONS

This application is a continuation of International Application No. PCT/CN2017/097221, filed on Aug. 11, 2017, which claims priority to Chinese Patent Application No. 201610666011.2, filed on Aug. 12, 2016. The disclosures of the aforementioned applications are hereby incorporated by reference in their entireties.

TECHNICAL FIELD

Embodiments of the present invention relate to wireless communications technologies, and in particular, to a handover method, a base station, and a communications system.

BACKGROUND

Research on the new radio access technology (New RAT, NR, or NRAT) increasingly deepens as user requirements constantly increase. Compared with an existing wireless communications system, a communications system that uses the new radio access technology can provide a lower latency and larger bandwidth and support a large quantity of connections, to meet increasing requirements of mobile communications.

An eLTE (evolved Long Term Evolution) eNB (evolved NodeB) emerges on the basis of the new RAT and a base station device on a Long Term Evolution (LTE) access network, namely, an eNB. The eLTE eNB is a base station device on a new radio access network. The eLTE eNB can be connected to both a core network corresponding to an existing radio access network, for example, an evolved packet core (EPC), and a core network corresponding to the new radio access network, for example, a next-generation core (NG Core).

If user equipment (UE) that supports both services of the existing radio access network and services of the new RAT needs to be handed over from a connected base station device to an eLTE eNB in a movement process, core network relocation (CN relocation) needs to be completed. For example, the UE is handed over from the EPC to the NG core.

In the prior art, during inter-RAT handover, a source core network identifies a target core network by using a tracking area identifier of the target core network, so as to complete the handover. However, during handover from the core network corresponding to the existing radio access network to the core network corresponding to the new radio access network, the source core network cannot accurately find the target core network based on the tracking area identifier; and as a result, a core network relocation process cannot be completed.

SUMMARY

Embodiments of the present invention provide a handover method, a base station, and a communications system, so that a source core network can accurately locate a target core network.

According to a first aspect, an embodiment of the present invention provides a handover method, including: determining, by a source base station, to hand user equipment (UE) over to a target base station, where the source base station is connected to a source core network device, and the target base station is connected to both the source core network device and a target core network device; then sending, by the source base station, a handover required message to the source core network device, where the handover required message includes identification information of the target core network device, and the handover required message is used to instruct the source core network device to perform a core network relocation process with the target core network device.

The handover method provided in this embodiment of the present invention may be applied to a handover scenario in which the target base station supports both a source core network and a target core network. The identification information of the target core network device is carried in the handover required message, so that the source core network device can accurately identify the target core network device, thereby completing core network relocation and improving handover efficiency.

In a possible implementation of the first aspect, the method further includes: obtaining, by the source base station, configuration information of the target base station from the target base station, where the configuration information includes identification information of a core network device connected to the target base station and/or information indicating presence of a connection from the target base station to the core network device. Correspondingly, the identification information of the target core network device includes identification information of a target core network and/or connection indication information, and the connection indication information is used to indicate presence of a connection from the target base station to the target core network.

In a possible implementation of the first aspect, the configuration information includes either the identification information of the core network device connected to the target base station or the information indicating presence of a connection from the target base station to the core network device, and a location area identifier allocated to the target base station by the core network device connected to the target base station. Correspondingly, the identification information of the target core network device includes any one or a combination of a plurality of the following information: identification information of a target core network, connection indication information, and a location area identifier allocated to the target base station by the target core network device, and the connection indication information is used to indicate presence of a connection from the target base station to the target core network.

In a possible implementation of the first aspect, the obtaining, by the source base station, configuration information of the target base station from the target base station includes: sending, by the source base station, an interface connection setup request message to the target base station; and receiving, by the source base station, an interface connection setup response message from the target base station, where the connection setup response message includes the configuration information of the target base station.

Optionally, the interface setup request message includes configuration information of the source base station.

In a possible implementation of the first aspect, the method further includes: obtaining, by the source base station, capability information of the UE; and determining, by the source base station based on the capability information of the UE and the configuration information of the target base station, that the source core network device is to perform a core network relocation process with the target core network device.

Optionally, the source base station may send a core network relocation indication message to the source core network device, where the core network relocation indication message is used to instruct the source core network device to initiate a core network relocation process, including locating the target core network device and sending a forward relocation message to the target core network device.

According to the foregoing implementations, in an initial connection setup process between the source base station and the target base station, the two base stations have exchanged their configuration information, so that the source base station rapidly determines that the source core network device is to perform core network relocation with the target core network device. Therefore, a total handover process is simple and efficient.

In a possible implementation of the first aspect, the method further includes: sending, by the source base station, an interface handover request message to the target base station, where the interface handover request message includes capability information of the UE, so that the target base station determines, based on the capability information of the UE and the configuration information of the target base station, that the source core network device is to perform a core network relocation process with the target core network device; and receiving, by the source base station, an interface handover request response message from the target base station, where the interface handover request response message includes the configuration information of the target base station, and the interface handover request response message is used to instruct the source base station to send the handover required message to the source core network device.

The capability information of the UE is used to indicate that the UE supports both services of a RAT of the source base station and services of a RAT of the target base station.

According to the foregoing implementation, the target base station makes decision whether to perform a core network relocation process, so that the configuration information of the base stations is exchanged in a handover process, and a handover process of the UE is completed. The target base station can obtain information about the target core network in time. Therefore, decision accuracy is high.

In a possible implementation of the first aspect, the obtaining, by the source base station, configuration information of the target base station from the target base station includes: receiving, by the source base station, a base station configuration update message from the target base station, where the base station configuration update message includes updated configuration information of the target base station.

According to a second aspect, to implement the handover method in the first aspect, an embodiment of the present invention provides a base station. The base station has a function of implementing the actions of the source base station in the handover method. The function may be implemented by hardware or may be implemented by hardware executing corresponding software. The hardware or the software includes one or more modules corresponding to the foregoing function.

In a possible implementation of the second aspect, the base station includes a plurality of functional modules, configured to implement any handover method in the first aspect, so that a source core network device can accurately identify a target core network device, thereby completing core network relocation and improving handover efficiency.

In a possible implementation of the second aspect, a structure of the base station includes a processor, a transceiver, and a communications module. The processor is configured to support the base station in performing the corresponding function in the handover method. The transceiver is configured to support communication between the base station and UE. The communications module is configured to support communication between the base station and another network device and send information or an instruction in the handover method to the network device. The base station may further include a memory. The memory is coupled to the processor and stores a program instruction and data necessary for the base station to perform the handover method.

According to a third aspect, an embodiment of the present invention provides a handover method, including: determining, by a target base station, a target core network device; and sending, by the target base station, an indication message to a source base station, where the indication message is used by a source core network device to perform a core network relocation process with the target core network device, the source base station is connected to the source core network device, and the target base station is connected to both the source core network device and the target core network device.

Optionally, the indication information may be an interface handover request response message, identification information of a target core network, or a separate indication bit.

According to a fourth aspect, to implement the handover method in the first aspect or the third aspect, an embodiment of the present invention provides a base station. The base station has a function of implementing the actions of the target base station in the handover method. The function may be implemented by hardware or may be implemented by hardware executing corresponding software. The hardware or the software includes one or more modules corresponding to the foregoing function.

According to a fifth aspect, an embodiment of the present invention provides a handover method, including: receiving, by a source core network device, a handover required message from a source base station, where the handover required message includes identification information of a target core network device; and performing, by the source core network device, a core network relocation process with the target core network device based on the handover required message.

In a possible implementation of the fifth aspect, the performing, by the source core network device, a core network relocation process with the target core network device based on the handover required message includes: finding, by the source core network device, the target core network device based on the identification information of the target core network device; and then sending, by the source core network device, a forward relocation request message to the target core network device, to instruct the target core network device to create a bearer resource for UE.

According to a sixth aspect, to implement the handover method in the fifth aspect, an embodiment of the present invention provides a core network device. The core network device has a function of implementing the actions of the source core network device in the handover method. The function may be implemented by hardware or may be implemented by hardware executing corresponding software. The hardware or the software includes one or more modules corresponding to the foregoing function.

According to a seventh aspect, an embodiment of the present invention provides a communications system. The system includes the base station in the second aspect, that is, a source base station; a target base station; and the core network device in the sixth aspect, that is, a source core network device. The source base station is connected to the source core network device, and the target base station is connected to the source core network device. The system further includes another core network device connected to the target base station, that is, a target core network device.

Optionally, the target base station in the communications system may be the base station in the fourth aspect, or may be another base station.

According to an eighth aspect, an embodiment of the present invention provides a computer storage medium, configured to store a computer software instruction for use by the base station provided in the second aspect, where the computer software instruction includes a program designed for executing the first aspect.

According to a ninth aspect, an embodiment of the present invention provides a computer storage medium, configured to store a computer software instruction for use by the base station provided in the second aspect, where the computer software instruction includes a program designed for executing the third aspect.

According to the technical solutions provided in the embodiments of the present invention, the source base station sends the handover required message to the source core network device after determining to hand the UE over to the target base station, where the handover required message includes the identification information of the target core network device, and the handover required message is used to instruct the source core network device to perform a core network relocation process with the target core network device. The technical solutions provided in the embodiments of the present invention may be applied to a handover scenario in which the target base station supports both the source core network and the target core network. The identification information of the target core network device is carried in the handover required message, so that the source core network device can accurately identify the target core network device.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic diagram of an application scenario of an embodiment of the present invention;

FIG. 2 is a schematic flowchart of a handover method according to an embodiment of the present invention;

DETAILED DESCRIPTION OF ILLUSTRATIVE EMBODIMENTS

Figure 3:
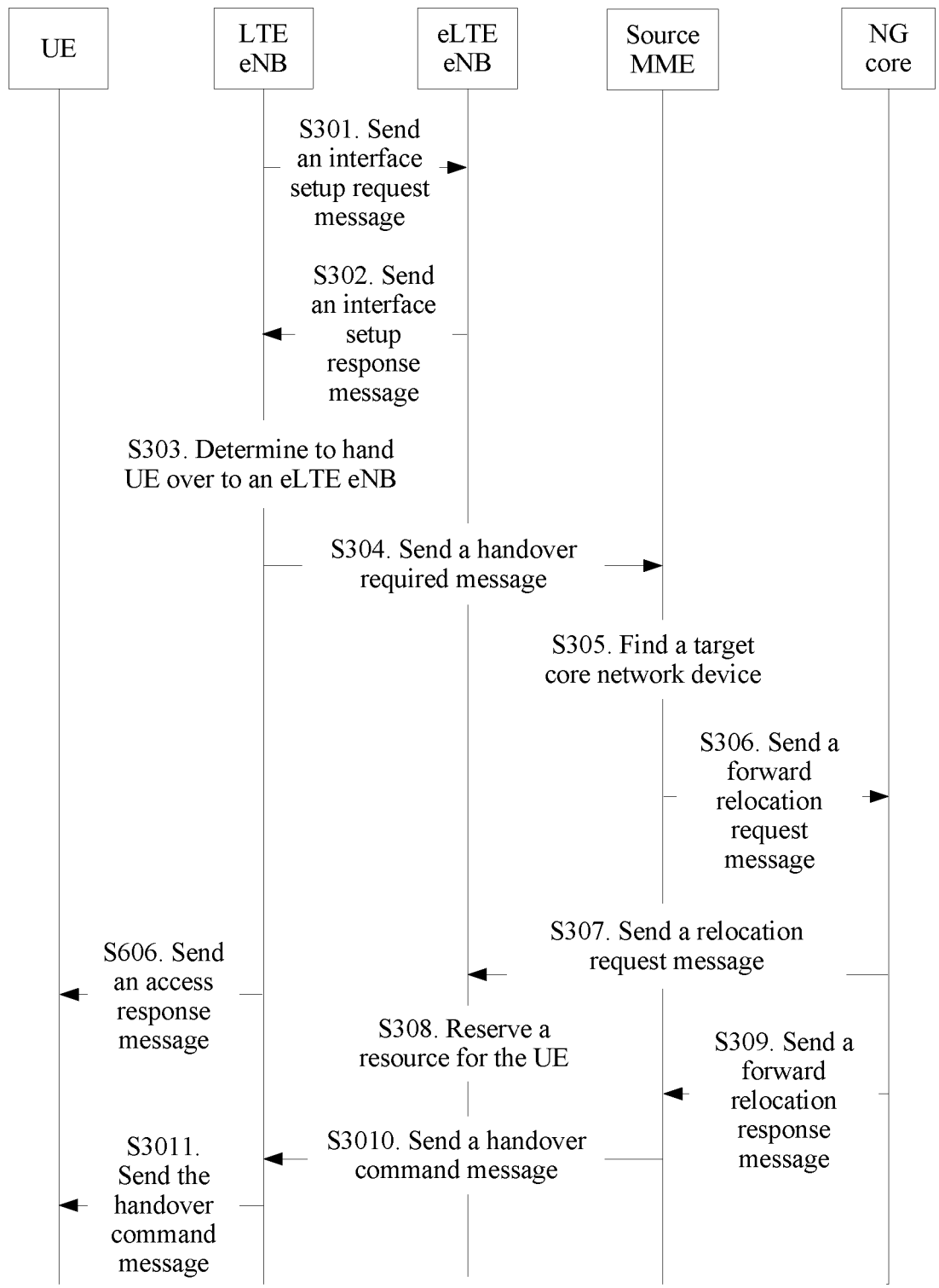
FIG. 3 is a schematic signaling flowchart of a handover method according to an embodiment of the present invention.

The technology described in the embodiments of the present invention may be applied to various communications systems, for example, second generation (2G) systems such as a Global System for Mobile Communications (GSM), third generation (3G) systems such as a Wideband Code Division Multiple Access (WCDMA) system, fourth generation (4G) systems such as LTE systems, fifth generation (5G) systems such as a communications system that uses the new radio access technology, and communications networks integrating a wireless local area network (WLAN) and a cellular network. The communications systems that use the new RAT include an evolved LTE system, other communications systems that use a 5G communications technology, and the like. No limitation is imposed in this sense.

An evolved packet core (EPC) in the embodiments of the present invention is a core network in an LTE system and includes devices such as a mobility management entity (MME) responsible for signaling processing, a serving gateway (S-GW) responsible for data processing, and a packet data network gateway (PDN gateway, P-GW).

An NG core (NGC) in the embodiments of the present invention may also be referred to as a new core (New Core), a 5G new core, a 5G core, or the like; and is a core network connected to a radio access network that uses a new RAT (referred to briefly as a "new RAT access network"). A next-generation radio access network (next-generation radio access network, NG RAN) similar to the foregoing new RAT access network may include at least two types of base stations: a base station (gNB) that uses a next-generation access technology (New Radio, NR), and an eLTE eNB enhanced based on an original LTE eNB. The NG core is disposed independent of an existing core network. For a specific device in the NG core, reference may be made to a device in the EPC. For example, the NG core includes devices having functions similar to the MME and the S-GW, and all functional entities may be integrated into one device, or a plurality of devices may be configured based on functions with each device having one or more core network functions. The embodiments of the present invention set no special limitation in this sense.

UE in the embodiments of the present invention may include a handheld device, an in-vehicle device, a wearable device, or a computing device having a wireless communication function, or other processing devices connected to a wireless modem, and various forms of user devices, mobile stations (MS), terminals, terminal equipment, and the like, which are referred to as "user equipment" or "UE" in this application for ease of description.

In the embodiments of the present invention, a unidirectional communication link from a base station to UE is defined as a downlink and a unidirectional communication link from the UE to the base station is defined as an uplink.

A resource in the embodiments of the present invention is a transmission resource, including a time domain resource and a frequency domain resource, and may be used to carry data or signaling in an uplink communication process or a downlink communication process. To be specific, the resource in the embodiments of the present invention may be an uplink resource that is allocated by the base station to the UE and that is used by the UE to send uplink data, or may be a downlink resource that is allocated by the base station to the UE and that is used by the UE to receive downlink data.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification indicates an "or" relationship between the associated objects.

"A plurality of" in the embodiments of the present invention means two or more. Descriptions such as first and second in the embodiments of the present invention are merely intended for an illustrative purpose and for distinguishing between described objects but do not indicate a specific sequence or specially limit a quantity of devices in the embodiments of the present invention, and therefore do not constitute any limitation on the embodiments of the present invention.

"Connection" in the embodiments of the present invention means various types of connection manners such as a direct connection or an indirect connection. For example, different devices are connected through a communications interface. No limitation is set.

"Network" and "system" in the embodiments of the present invention are a same concept, and a communications system is a communications network.

FIG. 1 is a schematic diagram of an application scenario of an embodiment of the present invention. A communications system shown in FIG. 1 includes a base station device (described as an LTE eNB below and in the drawings) on an LTE access network and a base station device (described as an eLTE eNB below and in the drawings) on a new RAT access network. The LTE eNB is connected to an EPC through an S1 interface. The eLTE eNB is connected to the EPC through an S1 interface and is connected to an NG core through an NG1 interface. A communications interface, for example, an X2 interface shown in the figure, may exist between the LTE eNB and the eLTE eNB, and the interface is used to exchange information between the base stations. It may be understood that the eLTE eNB is a base station device evolved based on an eNB and supports connection to different types of core networks. It may be understood that both the S1 interfaces and the NG1 interface are intended for an illustrative purpose. During actual application, the eLTE eNB may be connected to the EPC or the NG core in another manner.

UE changes its connected base station through handover in a movement process, to obtain optimal communication services. As shown in FIG. 1, when UE that is connected to the LTE eNB moves to signal coverage of the eLTE eNB, the UE may start a handover process to be handed over from the LTE eNB to the eLTE eNB. In this process, a core network relocation (CN relocation) process, or referred to as a core network reconfiguration process, needs to be completed to transfer a context of the UE from the EPC to the NG core.

A source base station in the embodiments of the present invention is a base station device that the UE is connected to or camps on currently, and the UE is to be handed over from the base station device to another base station device. The source base station may be a base transceiver station (BTS) or a base station controller in GSM, may be a NodeB or a radio network controller (RNC) in a WCDMA system, may be an eNB in an LTE system, may be an NR gNB or an eLTE eNB in a 5G system, or may be a new-type base station in a future evolved wireless communications network or a new wireless communications network. Correspondingly, a target base station in the embodiments of the present invention is a base station device to which the UE is to be handed over. The target base station may be a base station device that supports at least two types of core networks, for example, an eLTE eNB.

A source core network device in the embodiments of the present invention is a device that provides core network services to the source base station. A target core network device in the embodiments of the present invention is a device that provides core network services to the target base station. It may be understood that the source core network device and the target core network device each may include one or more separately distributed or integrated functional entities.

Generally, during handover of the UE between radio access networks of different RATs, a core network to which the target base station belongs can be identified by using a location area identifier allocated by a source core network, so as to determine a target core network. However, if the target base station supports both the source core network and the target core network, a location area identifier of the target base station may have been allocated by the source core network, or the source core network and the target core network have allocated location area identifiers in different formats. In other words, the source core network and the target core network are core networks of different RATs, and the core networks of different RATs allocate and maintain respective location area identifiers. Alternatively, the source core network and the target core network may allocate location area identifiers in a same format to the target base station. In any one of the foregoing cases, the source core network cannot accurately identify the target core network based on the location area identifier. The location area identifier in the embodiments of the present invention is used to indicate a location area in which the UE is located in an idle mode. The location area includes one or more cells and includes a tracking area (TA) in an LTE system, a location area (LA) in a UMTS system, a moving area (MA) in a new RAT access network, or the like.

RATs are usually in a one-to-one correspondence with core networks. Therefore, during inter-system handover, only a RAT of a target system needs to be indicated to the UE. During inter-RAT handover, the UE performs subsequent processes by using a non-access stratum (NAS) corresponding to the target core network. In a scenario of this application, it is assumed that a target base station to which UE is to be handed over is an eLTE eNB. A RAT corresponding to the eLTE eNB is LTE, and there are two core network options corresponding to the eLTE eNB: an EPC and an NGC. Therefore, during handover of the UE from an LTE eNB to the eLTE eNB (or from a 5G NR gNB to the eLTE eNB), if the UE is not particularly notified, the UE may use, by default according to the prior art, a NAS corresponding to the EPC. As a result, handover to an NG core connected to the eLTE eNB cannot be completed.

Therefore, a core network type corresponding to the target system needs to be indicated to the UE in the handover process.

For example, based on the application scenario shown in FIG. 1, the eLTE eNB supports core networks of two RATs: an EPC and an NG core. If the eLTE eNB uses a tracking area identifier (TAI) allocated by the EPC, or both the TAI allocated by the EPC and a moving area identifier (MAI) allocated by the NG core are configured for the eLTE eNB, or the TAI allocated by the EPC and the MAI allocated by the NG core are identifiers in a same format, a source MME cannot correctly identify the NG core. As a result, core network relocation cannot be completed, thereby affecting a handover process of the UE. In addition, if the eLTE eNB is connected to a plurality of NG cores, an NG core to which the UE is to be handed over cannot be determined based on available information.

For another example, in a scenario of handover from an NR gNB to an eLTE eNB and/or a scenario of handover from an eLTE eNB to an eLTE eNB, the target base station eLTE eNB supports core networks of two RATs: an EPC and an NG core. If the eLTE eNB uses a tracking area identifier (TAI) allocated by the EPC, or both the TAI allocated by the EPC and a moving area identifier (MAI) allocated by the NG core are configured for the eLTE eNB, or the TAI allocated by the EPC and the MAI allocated by the NG core are identifiers in a same format, in these cases, a source core network device cannot correctly identify whether a target core network is the NG core. As a result, inter-system handover or intra-system handover involving core network relocation cannot be completed, thereby affecting a handover process of the UE. Therefore, based on an architecture integrating a new RAT access network (or a next-generation radio access network) and an existing radio access network, the embodiments of the present invention provide a handover method for a scenario in which a target base station supports both a source core network and a target access network.

FIG. 2 shows a handover method according to an embodiment of the present invention. As shown in FIG. 2, the method includes steps S201 and S202.

S201. A source base station determines to hand user equipment UE over to a target base station.

The source base station is connected to a source core network device. The target base station is connected to both the source core network device and a target core network device. The source core network device and the target core network device belong to core networks of different RATs.

In a feasible design, in step S201, the source base station may be connected to at least one core network, including a source core network. The target base station may be connected to at least two core networks, including the source core network. A target core network may be different from the source core network, or the target core network may be the same as the source core network.

Specifically, a communications interface exists between the source base station and the source core network device, and a communications interface exists both between the target base station and the source core network device and between the target base station and the target core network device. The source core network may be the same as the target core network, or the source core network may be different from the target core network.

Optionally, the source base station may determine the target base station based on a measurement report reported by the UE. The measurement report may include signal transmission information, such as signal quality and signal strength, of each base station that is measured by the UE. The source base station may determine, based on a signal transmission status of each base station, the target base station for access by the UE. A specific selection process is not described in detail herein.

S202. The source base station sends a handover required (handover required) message to a source core network device, where the handover required message includes identification information of a target core network device.

A name of the handover required message sent herein is not limited, provided that the message is sent to the source core network device by the source base station for requesting handover in the sense of functionality and includes the identification information of the target core network device. Optionally, the identification information of the target core network device may be carried in another message and sent to the source core network device. No limitation is imposed herein.

In S202, the source core network device finds the target core network device based on the received identification information of the target core network device, and sends a relocation request (relocation request) message (or another message having a function similar to that of the relocation request message, where a name is not limited) to the target core network device. The target core network device performs a response process after receiving the relocation request message. The handover required message may be used to request the target base station to prepare a resource in advance.

Alternatively, the handover required message may be used to instruct the source core network device to perform a core network relocation process with the target core network device. Specifically, the core network relocation process is a process of transferring a context of the UE from the source core network to the target core network. This process includes that the source core network device finds the target core network device based on the identification information of the target core network device and sends the relocation request (relocation request) message to the target core network device, and includes a series of response processes performed by the target core network device after the target core network device receives the relocation request message.

The identification information of the target core network device may include one or a combination of a plurality of the following information: identification information of the target core network, core network connection indication information, and a location area identifier allocated to the target base station by the target core network device. The connection indication information is used to indicate presence of a connection from the target base station to the target core network.

In a feasible design, the target core network device and the source core network device may be a same device.

In combination with S201 and/or S202 in the foregoing operations or as an independent solution design, a feasible handover design solution includes the following steps.

S203. The target core network device sends, to the target base station, a message intended as a handover request.

The message intended for handover may be a handover request (handover request) message. In a feasible design, the message intended as a handover request (the handover request message) carries type information of the target core network and/or type information of the source core network. Optionally, the message intended for handover (the handover request message) may be further used to request the target base station to prepare a resource for the handover.

S204. The target base station sends a response to the target core network device.

Specifically, after the target base station determines to accept the handover (a determining process of the target base station is optional), the target base station sends the response to the target core network device. The response may be a handover request response (handover request ACK) message. The response (or the handover request response message) carries a handover instruction that needs to be sent to the UE. For example, the handover instruction is a handover command (handover command) message, or the handover instruction includes a handover command (handover command) message. In a feasible design, the handover instruction (or the handover command message) may be included in a target to source transparent container for transmission. The handover instruction (or the handover command message) carries the type information of the target core network. The type information of the target core network may be used to indicate that after being handed over to the target base station, the UE needs to use a NAS stratum corresponding to the target core network.

Optionally, the type information of the target core network may not be carried by using the message described in S204, provided that the type information of the target core network can be included in the response sent to the target core network device by the target base station. Optionally, the type information of the target core network may be carried in another message sent to the target core network device by the target base station, provided that the type information of the target core network can be transmitted and can instruct the UE to use the NAS stratum corresponding to the target core network after the UE is handed over to the target base station.

The type information of the target core network includes at least one of the following information: a type of the target core network, a NAS stratum for use after the handover, and an indication indicating whether to change a NAS stratum in current use.

Optionally, the handover command message (or the handover instruction) may carry the type information of the target core network in either of the following expression manners:

Manner 1: Include explicit core network type information, for example, EPC or NGC.

Manner 2: Include an implicit indication, for example, retaining a type of the source core network or changing a core network type. For example, a specific message bit is used for indication. For example, 0 indicates that the type of the target core network is the same as the type of the source core network, and 1 indicates that the type of the target core network is different from the type of the source core network and the UE needs to change an operating NAS stratum. It may be understood that if this manner is used, the target base station needs to obtain the type of the source core network. In this case, the message intended as a handover request sent to the target base station by the target core network device needs to carry the type information of the source core network.

Optionally, the handover command message (or the handover instruction) may carry the type information of the target core network in either of the following optional manners:

Manner 1: Add the type information of the target core network to an existing type of radio resource control (radio resource control, RRC) message. For example:

1. In a scenario of handover from an LTE eNB or an eLTE EPC to an eLTE NGC, an RRCConnectionReconfiguration message may be used as a handover command (where a specific message name is not limited, provided that the message is an RRC message that can be used as a handover command). An information element (IE) in the RRCConnectionReconfiguration message carries the type information of the target core network. For example, the IE (for example, MobilityControlInfo) in the RRCConnectionReconfiguration message carries a target cell identity and information indicating that the type of the target core network is NGC. After receiving the RRC message, the UE switches from an EPC NAS to an NGC NAS. Optionally, the RRC message may further carry configuration information related to security of the NGC. It should be noted that the "eLTE EPC" is a core network device whose core network type is EPC and that is to be accessed by the UE through the eLTE eNB; and that the "eLTE NGC" is a core network device whose core network type is NGC and that is to be accessed by the UE through the eLTE eNB.

2. In a scenario of handover from an LTE eNB or an eLTE EPC to an eLTE EPC, similarly, an RRCConnectionReconfiguration message may be used as a handover command (where a specific message name is not limited, provided that the message is an RRC message that can be used as a handover command). The message carries the type information of the target core network. For example, an IE (for example, MobilityControlInfo) in the message carries a target cell identity and information indicating that the type of the target core network is EPC. After receiving the RRC message, the UE continues to use an EPC NAS at the target base station. Optionally, if an RRCConnectionReconfiguration message that carries MobilityControlInfo and that is not enhanced is used as a handover command, the target core network is an EPC by default.

3. In a scenario of handover from an NR gNB to an eLTE EPC, a MobilityFromNRCommand message may be used as a handover command. The message carries the type information of the target core network. For example, an IE (handover) in the message carries information indicating that a target RAT type is eLTE EPC (eutra-epc), and/or when a target cell identity is given, carries information indicating that the type of the target core network is EPC. After receiving the message, the UE switches from an NGC NAS to an EPC NAS. Optionally, the message may carry configuration information related to security of the EPC.

4. In a scenario of handover from an NR gNB to an eLTE NGC, a MobilityFromNRCommand message may be used as a handover command. The message carries the type information of the target core network. For example, an IE (handover) in the message carries information indicating that a target RAT type is eLTE NGC (eutra-ngc), and/or when a target cell identity is given, carries information indicating that the type of the target core network is NGC. After receiving the message, the UE continues to use an NGC NAS.

5. In a scenario of handover from an eLTE NGC to an eLTE NGC, an RRCConnectionReconfiguration message may be used as a handover command. The message carries the type information of the target core network. For example, an IE (MobilityControlInfo) in the message carries a target cell identity and carries information indicating that the type of the target core network is NGC. After receiving the message, the UE continues to use an NGC NAS. Optionally, if an RRCConnectionReconfiguration message that carries MobilityControlInfo and that is not enhanced is used as a handover command, the target core network is the same as the source core network, and the UE does not change a NAS stratum and continues to use an NGC NAS.

6. In a scenario of handover from an eLTE NGC to an eLTE EPC, an RRCConnectionReconfiguration message is used as a handover command. The message carries the type information of the target core network. For example, an IE (MobilityControlInfo) in the message carries a target cell identity and carries information indicating that the type of the target core network is EPC. After receiving the message, the UE switches from an NGC NAS to an EPC NAS. Optionally, the RRC message may further carry configuration information related to security of the EPC. Optionally, if an RRCConnectionReconfiguration message that carries MobilityControlInfo and that is not enhanced is used as a handover command, the target core network is an EPC by default.

Manner 2: Define a new type of RRC message to indicate a handover scenario in which the source base station and/or the target base station are/is eLTE. Any one of the following examples may be used:

1. For handover from an LTE eNB or an eLTE EPC to an eLTE NGC, a first RRC message is used as a handover command and is used to indicate that the type of the target core network is NGC. After receiving the message, the UE switches from an EPC NAS to an NGC NAS. Optionally, the newly defined first RRC message is used to indicate, by using information carried in the message or through function definition of the message, that the type of the target core network is NGC. Optionally, the message carries configuration information related to security of the NGC.

2. For handover from an LTE eNB or an eLTE EPC to an eLTE EPC, a prior RRCConnectionReconfiguration message is used as a handover command, and the type of the target core network is EPC by default. After receiving the message, the UE does not change a NAS stratum.

3. For handover from an NR gNB to an eLTE EPC, a MobilityFromNRCommand message is used as a handover command, and the type of the target core network is EPC by default. After receiving the message, the UE switches from an NGC NAS to an EPC NAS. Optionally, the message carries configuration information related to security of the EPC.

4. For handover from an NR gNB to an eLTE NGC, a second RRC message is used as a handover command and is used to indicate that the type of the target core network is NGC. After receiving the message, the UE continues to use an NGC NAS. Optionally, the newly defined second RRC message is used to indicate, by using information carried in the message or through function definition of the message, that the type of the target core network is NGC.

5. For handover from an eLTE NGC to an eLTE NGC, a first new RRC message is used as a handover command and is used to indicate that the type of the target core network is NGC. After receiving the message, the UE continues to use an NGC NAS. Further optionally, the message carries configuration information related to security of the NGC. Optionally, the newly defined first new RRC message is used to indicate, by using information carried in the message or through function definition of the message, that the type of the target core network is NGC. Optionally, if an existing RRCConnectionReconfiguration message that carries MobilityControlInfo is used as a handover command, it indicates that the target core network is the same as the source core network, and the UE does not change a NAS stratum and continues to use an NGC NAS.

6. For handover from an eLTE NGC to an eLTE EPC, a third RRC message is used as a handover command and is used to indicate that the target core network is an EPC. After receiving the message, the UE switches from an NGC NAS to an EPC NAS. Further optionally, the message carries configuration information related to security of the EPC. Optionally, the newly defined third RRC message is used to indicate, by using information carried in the message or through function definition of the message, that the type of the target core network is NGC. Optionally, if an existing RRCConnectionReconfiguration message that carries MobilityControlInfo is used as a handover command, it indicates that the target core network is an EPC, and the UE uses an EPC NAS after being handed over to the target base station.

It may be understood that the newly defined first RRC message, second RRC message, and third RRC message are messages different from currently defined RRC messages used as handover commands (for example, an RRCConnectionReconfiguration message, a HandoverfromLTE message, or a HandovertoLTE message in LTE that carries MobilityControlInfo). A difference may be specifically reflected by different message identifiers, different IEs included in the messages, different actions performed by the UE after the UE receives the message and the existing RRC message, or the like.

Optionally, when the UE learns, by interpreting the handover command message at an RRC layer, that a NAS needs to be changed after the handover, the UE indicates a corresponding NAS to the target core network, and optionally, also indicates the corresponding NAS to the source core network. For example, the indication process may be implemented through inter-layer primitive exchange between the NAS and the RRC layer. S205. The target core network device sends a relocation response message to the source core network device, where the message carries a handover instruction.

Specifically, after receiving the response information sent to the target core network device by the target base station, the target core network device sends the relocation response message to the source core network device, where the message includes the handover instruction. The handover instruction is sent to the UE by the source base station through an air interface, to instruct the UE to be handed over to the target base station. For example, the handover instruction is a handover command (handover command) message, or the handover instruction includes a handover command (handover command) message. In a feasible design, the handover instruction (or the handover command message) may be included in a target to source transparent container (target to source transparent container) for transmission. The handover instruction (or the handover command message) carries the type information of the target core network. The type information of the target core network may be used to indicate that after being handed over to the target base station, the UE needs to use a NAS stratum corresponding to the target core network.

S206. A source core network sends a message intended as a handover command to the source base station, where the message carries the handover instruction.

The message intended as a handover command may be a handover command (handover command) message. In a feasible design, the message intended as a handover command (or the handover command message) carries the handover instruction. The handover instruction is sent to the UE by the source base station through an air interface, to instruct the UE to be handed over to the target base station. For example, the handover instruction is a handover command (handover command) message, or the handover instruction includes a handover command (handover command) message. In a feasible design, the handover instruction (or the handover command message) may be included in a target to source transparent container (target to source transparent container) for transmission. The handover instruction (or the handover command message) carries the type information of the target core network. The type information of the target core network may be used to indicate that after being handed over to the target base station, the UE needs to use a NAS stratum corresponding to the target core network.

S207. The source base station sends the handover instruction to the UE through an air interface, where the handover instruction carries type information of a target core network that is used to indicate a type of the core network to be accessed by the UE through the target base station.

The type information of the target core network includes at least one of the following information: a type of the target core network, a NAS stratum for use after the handover, and an indication indicating whether to change a NAS stratum in current use.

Optionally, the handover instruction may carry the type information of the target core network in either of the following expression manners:

Manner 1: Include explicit core network type information, for example, EPC or NGC.

Manner 2: Include an implicit indication, for example, retaining a type of the source core network or changing a core network type. For example, a specific message bit is used for indication. For example, 0 indicates that the type of the target core network is the same as the type of the source core network, and 1 indicates that the type of the target core network is different from the type of the source core network and the UE needs to change an operating NAS stratum. It may be understood that if this manner is used, the target base station needs to obtain the type of the source core network. In this case, the message intended as a handover request sent to the target base station by the target core network device needs to carry the type information of the source core network.

Optionally, the handover instruction may carry the type information of the target core network in either of the following optional manners:

Manner 1: Add the type information of the target core network to an existing radio resource control (radio resource control, RRC) message type. For example:

1. In a scenario of handover from an LTE eNB or an eLTE EPC to an eLTE NGC, an RRCConnectionReconfiguration message may be used as a handover command (where a specific message name is not limited, provided that the message is an RRC message that can be used as a handover command). An information element (information element, IE) in the RRCConnectionReconfiguration message carries the type information of the target core network. For example, the IE (for example, MobilityControlInfo) in the RRCConnectionReconfiguration message carries a target cell identity and information indicating that the type of the target core network is NGC. After receiving the RRC message, the UE switches from an EPC NAS to an NGC NAS. Optionally, the RRC message may further carry configuration information related to security of the NGC. It should be noted that the "eLTE EPC" is a core network device whose core network type is EPC and that is to be accessed by the UE through the eLTE eNB; and that the "eLTE NGC" is a core network device whose core network type is NGC and that is to be accessed by the UE through the eLTE eNB.

2. In a scenario of handover from an LTE eNB or an eLTE EPC to an eLTE EPC, similarly, an RRCConnectionReconfiguration message may be used as a handover command (where a specific message name is not limited, provided that the message is an RRC message that can be used as a handover command). The message carries the type information of the target core network. For example, an IE (for example, MobilityControlInfo) in the message carries a target cell identity and information indicating that the type of the target core network is EPC. After receiving the RRC message, the UE continues to use an EPC NAS at the target base station. Optionally, if an RRCConnectionReconfiguration message that carries MobilityControlInfo and that is not enhanced is used as a handover command, the target core network is an EPC by default.

3. In a scenario of handover from an NR gNB to an eLTE EPC, a MobilityFromNRCommand message may be used as a handover command. The message carries the type information of the target core network. For example, an IE (handover) in the message carries information indicating that a target RAT type is eLTE EPC (eutra-epc), and/or when a target cell identity is given, carries information indicating that the type of the target core network is EPC. After receiving the message, the UE switches from an NGC NAS to an EPC NAS. Optionally, the message may carry configuration information related to security of the EPC.

4. In a scenario of handover from an NR gNB to an eLTE NGC, a MobilityFromNRCommand message may be used as a handover command. The message carries the type information of the target core network. For example, an IE (handover) in the message carries information indicating that a target RAT type is eLTE NGC (eutra-ngc), and/or when a target cell identity is given, carries information indicating that the type of the target core network is NGC. After receiving the message, the UE continues to use an NGC NAS.

5. In a scenario of handover from an eLTE NGC to an eLTE NGC, an RRCConnectionReconfiguration message may be used as a handover command. The message carries the type information of the target core network. For example, an IE (MobilityControlInfo) in the message carries a target cell identity and carries information indicating that the type of the target core network is NGC. After receiving the message, the UE continues to use an NGC NAS. Optionally, if an RRCConnectionReconfiguration message that carries MobilityControlInfo and that is not enhanced is used as a handover command, the target core network is the same as the source core network, and the UE does not change a NAS stratum and continues to use an NGC NAS.

6. In a scenario of handover from an eLTE NGC to an eLTE EPC, an RRCConnectionReconfiguration message is used as a handover command. The message carries the type information of the target core network. For example, an IE (MobilityControlInfo) in the message carries a target cell identity and carries information indicating that the type of the target core network is EPC. After receiving the message, the UE switches from an NGC NAS to an EPC NAS. Optionally, the RRC message may further carry configuration information related to security of the EPC. Optionally, if an RRCConnectionReconfiguration message that carries MobilityControlInfo and that is not enhanced is used as a handover command, the target core network is an EPC by default.

Manner 2: Define a new RRC message type to indicate a handover scenario in which the source base station and/or the target base station are/is eLTE. Any one of the following examples may be used:

1. For handover from an LTE eNB or an eLTE EPC to an eLTE NGC, a first RRC message is used as a handover command and is used to indicate that the type of the target core network is NGC. After receiving the message, the UE switches from an EPC NAS to an NGC NAS. Optionally, the newly defined first RRC message is used to indicate, by using information carried in the message or through function definition of the message, that the type of the target core network is NGC. Optionally, the message carries configuration information related to security of the NGC.

2. For handover from an LTE eNB or an eLTE EPC to an eLTE EPC, an original RRCConnectionReconfiguration message is used as a handover command, and the type of the target core network is EPC by default. After receiving the message, the UE does not change a NAS stratum.

3. For handover from an NR gNB to an eLTE EPC, a MobilityFromNRCommand message is used as a handover command, and the type of the target core network is EPC by default. After receiving the message, the UE switches from an NGC NAS to an EPC NAS. Optionally, the message carries configuration information related to security of the EPC.

4. For handover from an NR gNB to an eLTE NGC, a second RRC message is used as a handover command and is used to indicate that the type of the target core network is NGC. After receiving the message, the UE continues to use an NGC NAS. Optionally, the newly defined second RRC message is used to indicate, by using information carried in the message or through function definition of the message, that the type of the target core network is NGC.

5. For handover from an eLTE NGC to an eLTE NGC, a first new RRC message is used as a handover command and is used to indicate that the type of the target core network is NGC. After receiving the message, the UE continues to use an NGC NAS. Further optionally, the message carries configuration information related to security of the NGC. Optionally, the newly defined first new RRC message is used to indicate, by using information carried in the message or through function definition of the message, that the type of the target core network is NGC. Optionally, if an existing RRCConnectionReconfiguration message that carries MobilityControlInfo is used as a handover command, it indicates that the target core network is the same as the source core network, and the UE does not change a NAS stratum and continues to use an NGC NAS.

6. For handover from an eLTE NGC to an eLTE EPC, a third RRC message is used as a handover command and is used to indicate that the target core network is an EPC. After receiving the message, the UE switches from an NGC NAS to an EPC NAS. Further optionally, the message carries configuration information related to security of the EPC. Optionally, the newly defined third RRC message is used to indicate, by using information carried in the message or through function definition of the message, that the type of the target core network is NGC. Optionally, if an existing RRCConnectionReconfiguration message that carries MobilityControlInfo is used as a handover command, it indicates that the target core network is an EPC, and the UE uses an EPC NAS after being handed over to the target base station.

It may be understood that the newly defined first RRC message, second RRC message, and third RRC message are messages different from currently defined RRC messages intended as handover commands (for example, an RRCConnectionReconfiguration message, a HandoverfromLTE message, or a HandovertoLTE message in LTE that carries MobilityControlInfo). A difference may be specifically reflected by different message identifiers, different IEs included in the messages, different actions performed by the UE after the UE receives the message after the UE receives the existing RRC message, or the like.

S208. After receiving the handover instruction sent by the source base station, the UE uses, based on the type information of the target core network that is carried in the handover instruction, a NAS stratum corresponding to the target core network after being handed over to the target base station. For example, if the target core network is the same as the source core network, a NAS corresponding to the source core network continues to be used. If the target core network is different from the source core network, the NAS corresponding to the source core network is no longer used, and the NAS corresponding to the target core network starts to be used. Specifically, when the UE learns, by interpreting the handover command message at the RRC layer, that a NAS needs to be changed after the handover, the UE indicates a corresponding NAS to the target core network, and optionally, also indicates the corresponding NAS to the source core network. For example, the indication process may be implemented through inter-layer primitive exchange between the NAS and the RRC layer.

Optionally, the source base station determines, based on capability information of the UE and obtained configuration information of the target base station, that the source core network device is to perform a core network relocation process with the target core network device, or determines the type information of the target core network. The capability information of the UE is used to indicate that the UE supports both services of a RAT of the source base station and services of a RAT of the target base station, or the capability information of the UE is used to indicate that the UE supports target core network services of a RAT of the target base station.

Optionally, the source base station may obtain the configuration information of the target base station in any one of the following manners: by using an interface message between the source base station and the target base station, by using an interface message between the source base station and another neighboring base station, through OAM configuration, and from a message reported by the UE (for example, measurementResult in an ANR). Specifically, the UE may learn type information of a core network of a neighboring base station by reading a broadcast message of the neighboring base station, where the broadcast message of the neighboring base station carries the type information of the core network of the neighboring base station. The UE reports the type information of the core network to a serving base station (for example, the UE reports the information by using a measurement report). For example, the type information of the core network may include one or a combination of a plurality of the following information: identification information of the core network, core network connection indication information, and a location area identifier allocated to the neighboring base station by a device of the core network. The connection indication information is used to indicate presence of a connection from the target base station to the target core network.

Optionally, the handover required message further includes a handover type (handover type) indication, where the indication indicates a type of handover from the source base station to the target base station; and may further include the type information of the source core network and/or the type information of the target core network.

Optionally, the handover command may carry the type information of the source core network and/or the type information of the target core network, used to indicate a core network type to be used by the UE in the subsequent handover.

Optionally, some or all processes and actions in the steps or optional designs in the method of this embodiment of this application may be selected based on an actual requirement, so that type information of the target core network device can be transmitted between any two network elements in the method, and a network element in a handover process can accurately identify a type of the target core network device. Steps may be selected based on a requirement of a specific problem that needs to be resolved. For example, when the identification information of the target core network device needs to be transmitted between the target base station and the target core network device, only the solution in step 204 needs to be selected. Optionally, network element functions in this embodiment of this application may be separately implemented in a device with the following hardware structure. The hardware structure includes a memory, a transceiver, and at least one processor. The memory stores an instruction. The memory, the transceiver, and the at least one processor are interconnected through lines. The transceiver is configured to perform the message transmission and reception operations performed in the network element device in (all or some of) the foregoing method steps or feasible designs. The at least one processor call the instruction stored in the memory to perform the processing operations performed in the network element device in (all or some of) the foregoing method steps or feasible designs.

Optionally, network element functions in this embodiment of this application may be separately implemented in a chip system with the following hardware structure. The chip system may be applied to the foregoing network element. The hardware structure includes at least one processor, a memory, and an interface circuit. The interface circuit is responsible for information exchange between the chip system and the outside. The memory, the interface circuit, and the at least one processor are interconnected through lines. The at least one memory stores an instruction. The instruction is executed by the at least one processor, to perform the processing operations performed in the network element device in (all or some of) the foregoing method steps or feasible designs.

Optionally, network element functions in this embodiment of this application may be separately implemented by using computer instructions. The instructions may be stored in a computer readable storage medium. When the instruction runs on a computing device, the processing operations performed in the network element device in (all or some of) the foregoing method steps or feasible designs are performed.

According to the handover method provided in this embodiment of the present invention, the source base station sends the handover required message to the source core network device after determining to hand the UE over to the target base station, where the handover required message includes the identification information of the target core network device, and the handover required message is used to instruct the source core network device to perform a core network relocation process with the target core network device. The technical solution provided in this embodiment of the present invention may be applied to a handover scenario in which the target base station supports both the source core network and the target core network. The identification information of the target core network device is carried in the handover required message, so that the source core network device can accurately identify the target core network device, thereby completing core network relocation and improving handover efficiency.

The following describes in detail the handover method provided in the embodiments of the present invention by using an example in which UE is handed over from an LTE eNB to an eLTE eNB. To be specific, the LTE eNB is a source base station and the eLTE eNB is a target base station. Mutual reference may be made between the embodiments of the present invention. A core network connected to the LTE eNB is an EPC, and the EPC is a source core network. A source core network device includes an MME (referred to as a source MME) in the EPC. Core networks connected to the eLTE eNB is the EPC and an NG core, and the NG core is a target core network. A target core network device includes a device in the NG core.

It may be understood that the handover method provided in the embodiments of the present invention may be applied to a scenario in which UE is handed over from a source base station to a target base station that supports both a source core network and a target core network. The embodiments of the present invention do not impose any limitation on specific RATs of the source base station and the target base station.

FIG. 3 is a schematic signaling flowchart of a handover method according to an embodiment of the present invention. The method includes steps S301 to S308.

S301. An LTE eNB sends an interface setup request message to an eLTE eNB.

The interface setup request message may be specifically an X2 setup request (X2 setup request) message. In other words, the LTE eNB communicates with the eLTE eNB through an X2 interface. It is considered herein that an existing X2 interface is still used between the LTE eNB and the eLTE eNB, or a new interface may be used. The present invention sets no limitation.

Optionally, the interface setup request message includes configuration information of the LTE eNB. The configuration information of the LTE eNB includes information about a core network connected to the LTE eNB. The information about the core network may be specifically identification information of the core network and/or information indicating present of a connection from the LTE eNB to the core network. Optionally, the interface setup request message may further include information about a primary serving cell under the LTE eNB or information about a neighboring cell of the primary serving cell, including information such as a physical cell identifier (physical cell identifier, PCI) and a cell global identification (cell global identification, CGI). Details are not described herein.

S302. After receiving the interface setup request information, the eLTE eNB sends interface setup response information to the LTE eNB, where the interface setup response information message includes configuration information of the eLTE eNB.

The interface setup response message may be specifically an X2 setup response (X2 setup response) message.

Optionally, the configuration information of the eLTE eNB includes information about one or more core networks connected to the eLTE eNB. The information may be specifically identification information of the core network, and/or connection indication information indicating presence of connections from the eLTE eNB to the core networks, and the like, and is used to notify the LTE eNB of a core network connection status of the eLTE eNB. The information about the one or more core networks connected to the eLTE eNB may be information about all types of core networks supported by the eLTE eNB, including information about a source core network; or may be information about a core network supported by the eLTE eNB other than the source core network.

For example, if the eLTE eNB is connected to both an NG core and an EPC, and the LTE eNB has sent the X2 setup request message to the eLTE eNB, the eLTE eNB may add one or more of the following information to the X2 setup response message: connection indication information indicating presence of a connection from the eLTE eNB to the NG core and identification information of the NG core (next-generation core identity, NG Core ID). Optionally, the X2 setup response message may further include connection indication information indicating presence of a connection from the eLTE eNB to the EPC and/or identification information of the EPC.

Assuming that the NG core includes an MME-like entity and an S-GW, the identification information of the NG core may be an MME ID or an S-GW ID.

Optionally, the eLTE eNB may be connected to a plurality of NG cores. In this case, the X2 setup request message may carry information about all the NG cores.

Optionally, the configuration information may further include load information of each NG core connected to the eLTE eNB. The load information may be used by the LTE eNB to determine whether to initiate a core network relocation process and select a proper NG core for core network relocation.

Optionally, the load information may be further transmitted to the LTE eNB by using a resource status update (resource status update) message.

It may be understood that each core network may be connected to a plurality of base station devices, and each base station device can obtain information about a core network to which the base station device is connected.

Optionally, in an implementation of the present invention, the eLTE eNB has two types of location area identifiers: a TAI, also referred to as a location area code (tracking area code, TAC), allocated by the EPC and an MAI allocated by the NG core. The TAI and the MAI may be in different formats or the MAI is in a same format as the TAI. The MAI and the TAI may be both included in the configuration message of the eLTE eNB and sent to the LTE eNB. Optionally, if the eLTE eNB has only the TAI allocated by the EPC, in other words, if location area division is the same on a new RAT access network and an LTE access network, the eLTE eNB may not send the TAI configured for the eLTE eNB to the LTE eNB.

Optionally, in another implementation of the present invention, if a communications interface has been set up between the LTE eNB and the eLTE eNB, the eLTE eNB may also send configuration information that includes NG core related information to the LTE eNB by using a base station configuration update (configuration update) message. When detecting a change in the configuration information of the eLTE eNB, the eLTE eNB may add updated configuration information, for example, updated NG core related information, to the message, and notify the LTE eNB by using the message.

When a source base station, namely, the LTE eNB, completes an interface setup or configuration information update process with a target base station, namely, the eLTE eNB, the two base stations have obtained configuration information of each other, including information about a core network supported by each other. Then the LTE eNB may determine to perform core network relocation based on the obtained configuration information of the eLTE eNB. Specifically, the core network relocation process includes steps S303 to S3011.

S303. The LTE eNB determines to hand UE over to the eLTE eNB.

Specifically, the LTE eNB may determine, based on a measurement report reported by the UE or related measurement information of the UE obtained through measurement, the target base station to which the UE is to be handed over, in other words, determine that the eLTE eNB is the target base station.

Optionally, in an implementation of the present invention, the LTE eNB may further obtain capability information of the UE. The capability information of the UE is used to indicate that the UE supports both services of a RAT of the source base station and services of a RAT of the target base station. The LTE eNB may determine, based on the capability information of the UE and the configuration information of the eLTE eNB that is obtained in the interface setup or base station configuration update process, to perform a core network relocation process with the NG core that the eLTE eNB is connected to, that is, a target core network device. Specifically, the LTE eNB may learn, based on the connection indication information in the configuration information of the eLTE eNB, that the eLTE eNB is connected to the NG core, and then determine whether the NG core is suitable for handover based on core network load information. Alternatively, the LTE eNB may directly identify the NG core based on core network identification information.

S304. The LTE eNB sends a handover required message to a source MME, where the handover required message includes identification information of a target core network, and the handover required message is used to instruct a source core network device to perform a core network relocation process with a target core network device.

The identification information of the target core network includes one or more of the following information: the location area identifier of the target eLTE eNB, core network identification information, and core network relocation indication information.

As a device responsible for signaling processing on the source core network, the source MME receives and processes the handover required message sent by the LTE eNB.

Optionally, if a TAI and an MAI are configured for the eLTE eNB, the configuration information of the eLTE eNB that is obtained by the LTE eNB includes the MAI allocated to the eLTE eNB by the NG core, the NG core ID, and the connection indication information indicating presence of a connection from the eLTE eNB to the NG core. In this case, identification information of the eLTE eNB includes any one or more of the following information: the MAI, the NG core ID, and the connection indication information. Optionally, the configuration information may further include the TAI allocated to the eLTE eNB by the EPC. By using any one of the foregoing identification information, the source core network device can find the corresponding target core network device.

Optionally, if only a TAI is configured for the eLTE eNB, the configuration information of the eLTE eNB that is obtained by the LTE eNB includes the NG core ID and the connection indication information. In this case, identification information of the eLTE eNB includes the NG core ID and/or the connection indication information. Optionally, the configuration information may further include the TAI allocated to the eLTE eNB.

Optionally, identification information of the target core network device may be included in an information element (IE), for example, a target ID information element, in an existing handover request message; or may be included in a new information element.

Optionally, if the eLTE eNB is connected to a plurality of NG cores, the LTE eNB may select a proper NG core for handover, in other words, determine a target NG core based on obtained load information of each NG core; and write corresponding core network information into the handover required message.

Optionally, the handover required message may further include handover type information used to indicate that a type of core network relocation is LTE to new RAT. Specifically, a new type, for example, "LTEtoNR" or "LTEto5G" may be added to an existing handover type information element. This embodiment of the present invention imposes no limitation to the naming.

Optionally, the handover required message may further include core network relocation indication information used to instruct the source core network to perform core network relocation. Specifically, if the handover required message includes the handover type information, the handover type information may be used as an explicit core network relocation indication; or an indication bit is separately set. No limitation is imposed in this sense.

S305. The source MME finds the target core network device based on the handover required message.

Specifically, the source MME detects, from the handover required message, a core network relocation request sent by the LTE eNB; and may find the target NG core based on the identification information of the target core network device in the handover required message and prepare to send a forward relocation request (forward relocation request) message to the NG core.

Optionally, if the identification information includes the NG core ID, the target NG core may be directly determined based on the NG core ID.

Optionally, if the identification information includes an MAI, the source MME may determine, by searching a database, an NG core corresponding to the MAI.

Optionally, if the identification information includes only the connection indication information, the source MME may learn that the target base station is connected to a core network other than the source core network. Then the source MME may determine, based on a handover type, that inter-RAT handover is to be performed, and then randomly select a target core network from a core network in a target RAT. For example, the source MME may determine that the UE is to be handed over from an LTE cell to a new RAT cell, and the source MME may randomly select an NG core.

S306. The source MME sends a forward relocation request message to a target NG core.

Optionally, assuming that the NG core is similar to the EPC and includes devices such as an MME, an S-GW, and a P-GW, the forward relocation request is sent to a target MME. When detecting a change in a target S-GW, the target MME initiates a create session process, to create a bearer resource for the UE in the target S-GW.

S307. The NG core sends a relocation request message to the eLTE eNB, to instruct the eLTE eNB to reserve a resource.

Specifically, if the NG core includes devices such as an MME, an S-GW, and a P-GW, the target MME sends the relocation request message to the eLTE eNB.

S308. The eLTE eNB reserves a resource for the UE based on the received relocation request message.

Optionally, after reserving a resource, the eLTE eNB sends a relocation request response (relocation request ack) message to the NG core.

S309. The NG core sends a forward relocation response message to the source MME.

The target core network needs to create a forwarding channel on the target core network for a downlink data table between the source core network and the target core network during handover. Specifically, if the NG core includes devices such as an MME, an S-GW, and a P-GW, the NG core needs to create a data forwarding channel in a target S-GW for a downlink data packet between a source S-GW and the target S-GW during handover. After the data forwarding channel is set up, the target MME sends the forward relocation response to the source MME.

S3010. The source MME sends a handover command message to the LTE eNB.

S3011. The LTE eNB forwards the handover command message to the UE.

Specifically, that the UE successfully receives the handover command message indicates that the core network relocation process is completed. After receiving the handover message, the UE initiates a handover process. The specific handover process is not described herein.

In this embodiment, the source base station determines whether to perform core network relocation; and determines the target core network device based on related information, for example, core network identification information and connection indication information, of a core network connected to the target base station that is obtained in the interface setup or base station configuration information update process, thereby accurately handing the UE over from the source base station to the target base station.

Optionally, in another embodiment of the present invention, the target base station may determine whether to perform core network relocation. The following provides descriptions by still using an example in which UE is handed over from an LTE eNB to an eLTE eNB and the eLTE eNB supports both an EPC and an NG core.

Figure 4:
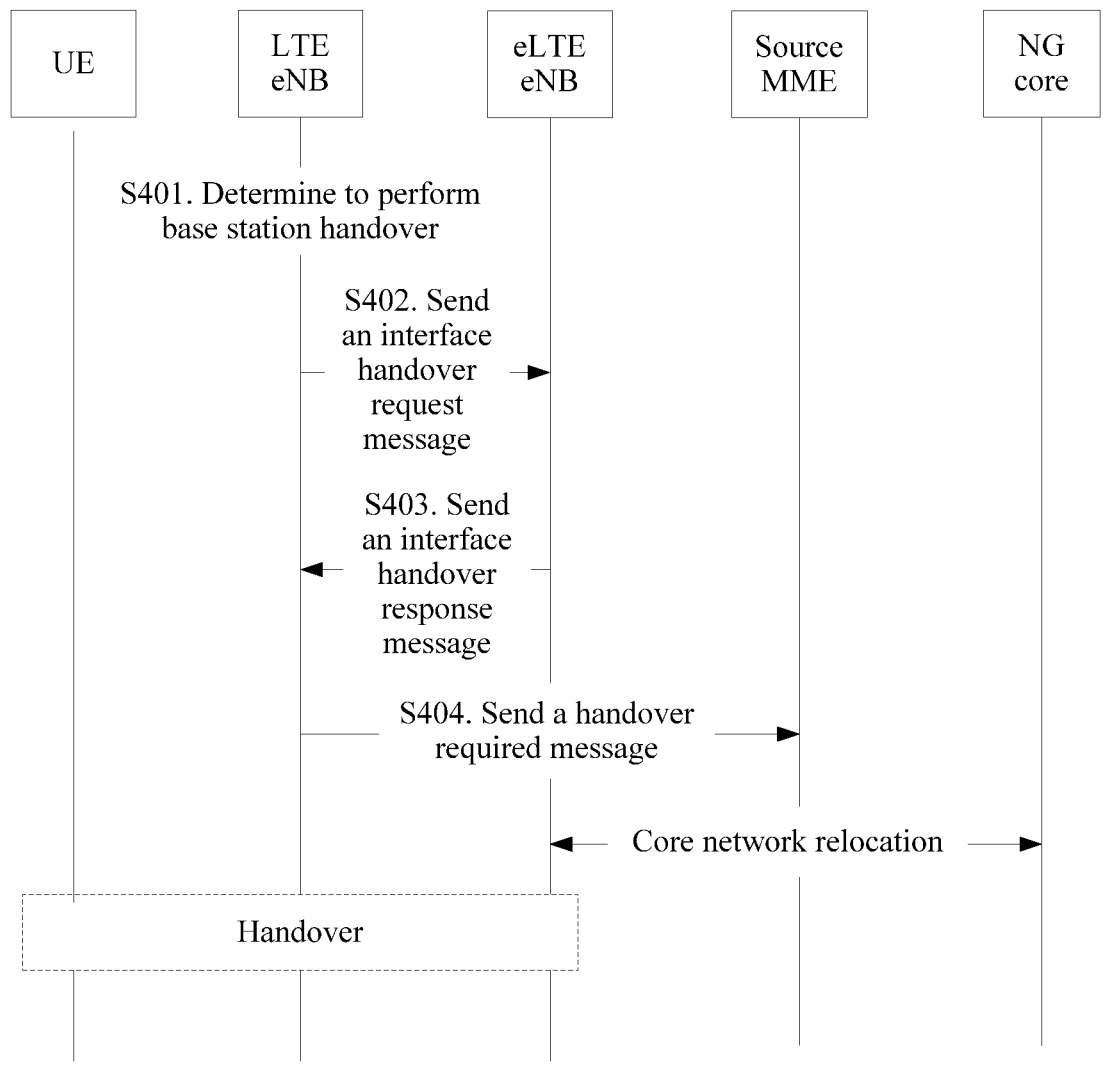
FIG. 4 is a schematic signaling flowchart of a method for determining core network relocation according to an embodiment of the present invention.

FIG. 4 is a schematic signaling flowchart of determining, by an eLTE eNB, to perform core network relocation, including steps S401 to S404.

S401. An LTE eNB determines to perform base station handover.

Specifically, the source base station may determine, based on a received measurement report of UE, that a target base station is the eLTE eNB.

S402. The LTE eNB sends an interface handover request message to the eLTE eNB.

Specifically, the interface handover request message may be an X2 handover request (X2 handover request) message. Optionally, the interface handover request message includes configuration information of the LTE eNB.

In this embodiment, the eLTE eNB determines to perform core network relocation. Specifically, the eLTE eNB may determine, based on capability information of the UE and configuration information of the eLTE eNB, to perform core network relocation. The configuration information of the eLTE eNB includes information about a core network supported by the eLTE eNB, for example, core network identification information, connection indication information indicating presence of a connection from the eLTE eNB to at least one core network, and load information of each core network. If the eLTE eNB supports a plurality of core networks of a same type, a target core network may be selected based on load of each core network or a target core network may be selected randomly. The eLTE eNB may obtain the capability information of the UE by using the handover request message sent by the LTE eNB. The capability information of the UE is used to indicate that the UE supports both services of a RAT of the source base station and services of a RAT of the target base station.

S403. After determining to perform core network relocation, the eLTE eNB sends an interface handover request response message to the LTE eNB.

The interface handover request response message is used to instruct the source base station to send a handover required message to a source core network device. The interface handover request response message includes a result of determining, by the eLTE eNB, to perform core network relocation. The result includes one or more of the following information: identification information of the target core network, core network relocation indication information, a location area identifier, and the like.

Optionally, the handover request response message may also include the configuration information of the eLTE eNB. After the LTE eNB receives the handover request response message, the LTE eNB may further determine the core network to which the UE is to be relocated. For specific content of the configuration information of the eLTE eNB, refer to related content in other embodiments of the present invention. Details are not described herein again.

S404. The LTE eNB sends a handover required message to a source core network device (shown as a source MME in the figure) based on the received result of determining by the eLTE eNB, to instruct the source core network device to initiate a core network relocation process to a target core network device (shown as an NG core in the figure).

Specifically, the LTE eNB may add the identification information of the target core network to the handover required message to be sent to the source core network device, namely, the source MME. For the identification information of the target core network, refer to related content in other embodiments of the present invention. Details are not described herein again.

For detailed descriptions of a specific core network relocation process and a handover process of the UE after the source core network device receives the handover required message, refer to related content in the embodiment shown in FIG. 3, for example, descriptions of S305 to S3011. Details are not described herein again.

In this embodiment, the target base station determines whether to initiate a core network relocation process, so that the configuration information of the base stations is exchanged in an interface handover process, and the handover process of the UE is completed. The target base station can obtain information about the target core network in time. Therefore, determining accuracy can be improved, thereby improving handover efficiency. This embodiment may be applied to a scenario in which an interface has been set up between a source base station and a target base station.

Figure 5:
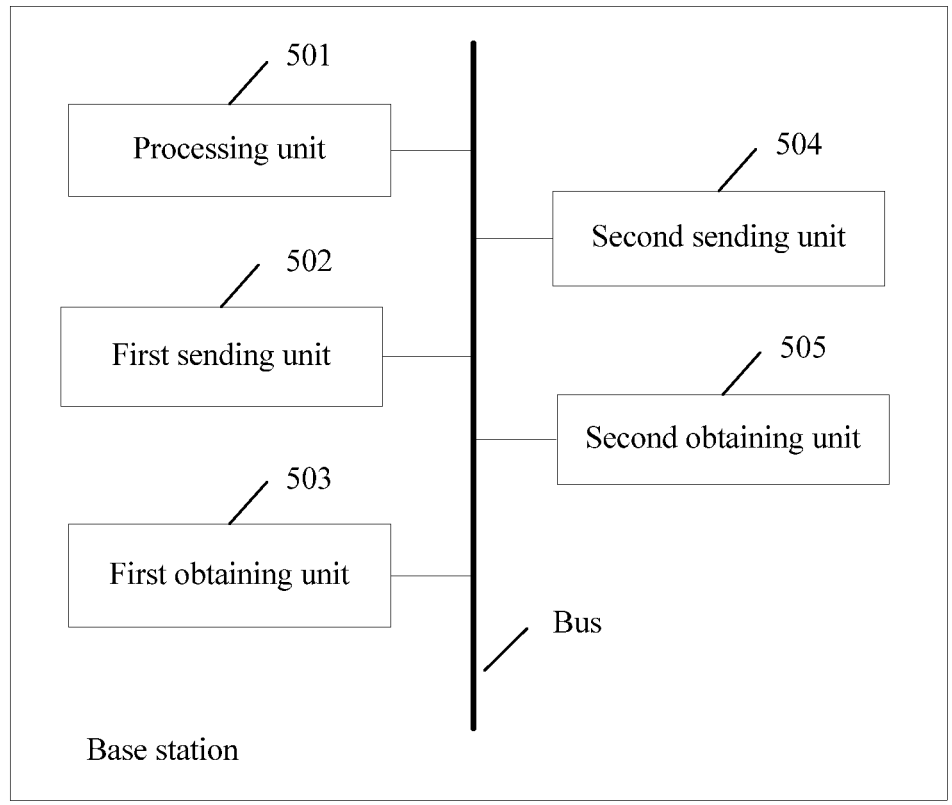
FIG. 5 is a schematic structural diagram of a base station according to an embodiment of the present invention.

FIG. 5 is a schematic structural diagram of a base station according to an embodiment of the present invention.

The base station may be used as a source base station in a handover process of UE. The base station is connected to a source core network device.

The base station includes a processing unit 501 configured to determine to hand the UE over to a target base station, where the target base station is connected to both the source core network device and a target core network device, where, for a process of determining the target base station, refer to related descriptions in the method embodiments of the present invention, and details are not described herein again, and a first sending unit 502, configured to send a handover required message to the source core network device, where the handover required message includes identification information of the target core network device, and the handover required message is used to instruct the source core network device to perform a core network relocation process with the target core network device.

Optionally, the base station further includes a first obtaining unit 503, configured to obtain configuration information of the target base station from the target base station, where the configuration information includes identification information of a core network device connected to the target base station and/or information indicating presence of a connection from the target base station to the core network device.

Optionally, the base station further includes a second sending unit 504, configured to send an interface handover request message to the target base station, where the interface handover request message includes capability information of the UE, so that the target base station determines, based on the capability information of the UE and the configuration information of the target base station, that the source core network device is to perform a core network relocation process with the target core network device, where the capability information of the UE is used to indicate that the UE supports both services of a RAT of the source base station and services of a RAT of the target base station. The first obtaining unit 503 is specifically configured to receive an interface handover request response message from the target base station, where the interface handover request response message includes the configuration information of the target base station, and the interface handover request response message is used to instruct the source base station to send the handover required message to the source core network device. For a process of determining, by the target base station, to perform core network relocation, refer to related content in the method embodiments of the present invention. Details are not described herein again.

Optionally, the second sending unit 504 is further configured to send an interface connection setup request message to the target base station, where the connection setup request message includes configuration information of the source base station. The first obtaining unit 503 is specifically configured to receive an interface connection setup response message from the target base station, where the connection setup response message includes the configuration information of the target base station.

Optionally, the first obtaining unit 503 is specifically configured to receive a base station configuration update message from the target base station, where the base station configuration update message includes updated configuration information of the target base station.

For details about specific content of the configuration information of the target base station and detailed descriptions of a process of obtaining the configuration information of the target base station, refer to related content in the methods of the present invention. Details are not described herein again.

Optionally, the identification information of the target core network device includes identification information of a target core network and/or connection indication information, and the connection indication information is used to indicate presence of a connection from the target base station to the target core network.

Optionally, in an implementation of the present invention, the configuration information further includes a location area identifier allocated to the target base station by the core network device connected to the target base station. For specific content of the location area identifier, refer to related descriptions in the method embodiments of the present invention. Details are not described herein again. In this embodiment, the identification information of the target core network device includes any one or a combination of a plurality of the following information: the identification information of the target core network, the connection indication information, and a location area identifier allocated to the target base station by the target core network device, and the connection indication information is used to indicate presence of a connection from the target base station to the target core network.

For detailed content and a sending process of the identification information of the target core network device, refer to related descriptions in the method embodiments of the present invention. Details are not described herein again.

Optionally, in an implementation of the present invention, the base station further includes a second obtaining unit 505, configured to obtain the capability information of the UE, where the capability information of the UE is used to indicate that the UE supports both services of the RAT of the source base station and services of the RAT of the target base station. The processing unit 501 is further configured to determine, based on the capability information of the UE and the configuration information of the target base station, that the source core network device is to perform a core network relocation process with the target core network device. For a process of determining, by the base station, to perform core network relocation, refer to related content in the method embodiments of the present invention. Details are not described herein again.

As shown in FIG. 5, the units in the base station may be interconnected through a communications bus. Alternatively, the units in the base station may be interconnected in another connection manner, which is not shown in the figure. This embodiment of the present invention sets no special limitation thereto.

In another embodiment of the present invention, in terms of hardware implementation, the functions of the processing unit 501 may be performed by a processor, and the functions of the first sending unit 502 may be performed by a transmitter. The transmitter may be located in a communications module of the base station, and the communications module may support the base station in communicating with another network device. The processing unit 502 may be integrated into or separate from the processor of the base station in a form of hardware, or may be stored in a memory of the base station in a form of software, so that the processor can invoke and perform operations corresponding to the foregoing modules.

It should be noted that when the base station further includes the first obtaining unit 503, the functions of the first obtaining unit 503 may be performed by a receiver; and when the base station further includes the second sending unit 504, the second sending unit 504 and the first sending unit 502 may be two independent hardware apparatuses having a sending function, for example, two independent transmitters, where the two transmitters may be located in the communications module of the base station. For another example, the first sending unit 502 is an interface between the base station and a core network device. When the base station further includes the second obtaining unit 505, the second obtaining unit 505 and the first obtaining unit 503 may be two independent hardware apparatuses having a receiving function, for example, two independent receivers, where the two receivers may be located in the communications module of the base station.

In an implementation, the functions of the first obtaining unit 503 and the second sending unit 504 may be implemented by a communications interface between the base station and another base station device, the functions of the second obtaining unit 505 may be implemented by a transceiver of the base station, or the functions of the first sending unit 502 may be implemented by a communications interface between the base station and a core network device.

Figure 6:
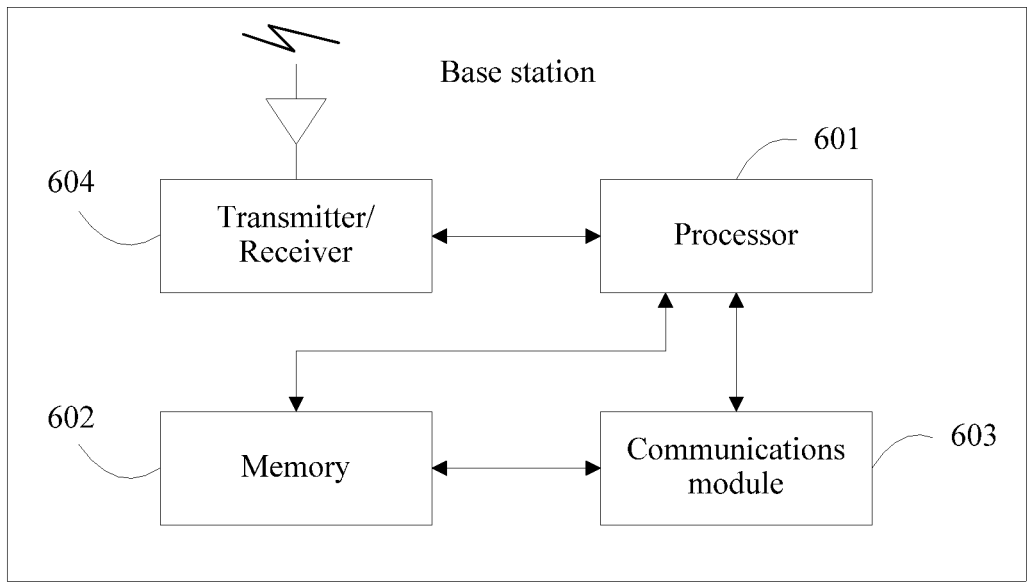
FIG. 6 is a schematic diagram of a structural design of a base station according to an embodiment of the present invention.

FIG. 6 is a simplified schematic diagram of a possible design structure of the base station in the foregoing embodiment. The control device may be used as a source base station from which UE is to be handed over.

The base station includes a processor 601, a memory 602, a transmitter/receiver 604, and a communications module 603. The processor 601 is configured to control and manage an action of the control device, to perform various functions to support a communication service provided by the control device. For example, the processor 601 is configured to support the control device in performing an operation performed by the source base station in FIG. 2 and FIG. 3, and/or another process performed by the source base station in the technology described in this specification.

The memory 602 is configured to store program code and data used by the base station to perform the handover method provided in the embodiments of the present invention. The program code includes a computer operation instruction. The program code stored in the memory 602 may be executed by the processor 601.

The transmitter/receiver 604 is configured to support communication between the base station and the UE.

The communications module 603 is configured to support communication between the base station and another network entity, for example, communication between a core network device and another base station device; and may include a communications interface between the base station and another base station and a communications interface between the base station and the core network device.

It may be understood that FIG. 6 shows merely a simplified design of the control device. During actual application, the control device may include any quantity of transmitters, receivers, processors, controllers, memories, communications modules, and the like. Details are not described herein.

According to the base station shown in the embodiment of FIG. 5 or FIG. 6, the identification information of the target core network device is carried in the handover required message, so that the source core network device can accurately identify the target core network device, thereby completing core network relocation and improving handover efficiency. Further, the base station provided in this embodiment functions as the source base station to determine whether to perform core network relocation and determine the target core network device based on related information of a core network connected to the target base station that is obtained in an interface setup or base station configuration information update process, thereby accurately handing the UE over from the source base station to the target base station.

Figure 7:
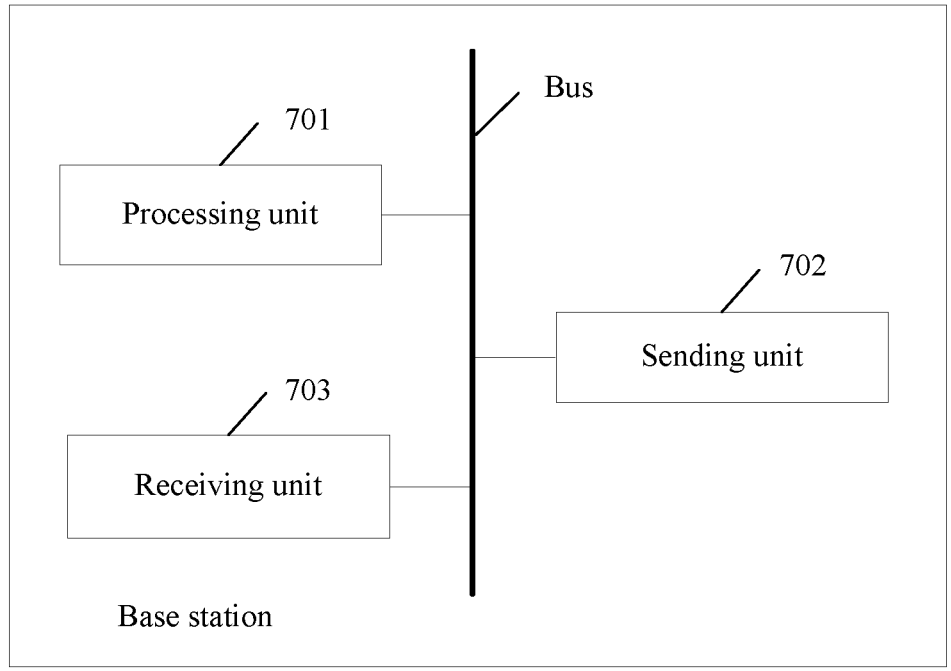
FIG. 7 is a schematic structural diagram of another base station according to an embodiment of the present invention.

FIG. 7 shows a base station according to an embodiment of the present invention.

The base station may be used as a target base station in a handover process of UE. The base station is connected to both a target core network and a source core network, and the source core network is further connected to a source base station.

The base station includes a processing unit 701 and a sending unit 702. The processing unit 701 is configured to determine a target core network device.

Specifically, when the base station is connected to a plurality of core networks of a same type as the target core network, the processing unit 701 may select a core network with lightest load as the target core network based on load of each core network.

The sending unit 702 is configured to send an indication message to the source base station, where the indication message is used by a source core network device to perform a core network relocation process with the target core network device.

Optionally, the indication message may be an interface handover request response message, and the interface handover request response message includes configuration information of the target base station. For specific content of the configuration information of the target base station, refer to related content in other embodiments of the present invention. Details are not described again. Specifically, in this embodiment, the base station further includes a receiving unit 703, configured to receive an interface handover request message sent by the source base station, where the interface handover request message includes capability information of the UE, and the capability information of the UE is used to indicate that the UE supports both services of a RAT of the source base station and services of a RAT of the target base station. The processing unit 701 is specifically configured to determine, based on the capability information of the UE and the configuration information of the target base station, that the source core network device is to perform a core network relocation process with the target core network device. The sending unit 702 is specifically configured to send the interface handover request response message to the source base station.

Optionally, the indication information may be identification information of the target core network device determined by the processing unit 701. In this case, the source base station that receives the identification information of the target core network device may add the identification information of the target core network device to a handover required message to be sent to the source core network device. Alternatively, the indication information may be an independently set indication bit. This embodiment of the present invention sets no limitation thereto.

For detailed descriptions of determining the core network relocation process by the base station, refer to related content in other embodiments of the present invention. Details are not described again.

As shown in FIG. 7, the units in the base station may be interconnected through a communications bus. Alternatively, the units in the base station may be interconnected in another connection manner, which is not shown in the figure. This embodiment of the present invention sets no special limitation thereto.

In another embodiment of the present invention, in terms of hardware implementation, the functions of the processing unit 701 may be performed by a processor, the functions of the sending unit 702 may be performed by a transmitter, and the functions of the receiving unit 703 may be performed by a receiver. The processing unit 701 may be embedded in or independent of the processor of the base station in a form of hardware, or may be stored in a memory of the base station in a form of software, so that the processor can invoke and perform operations corresponding to the foregoing modules. It may be understood that for an actual structural design of the base station, refer to the base station design shown in FIG. 5. Details are not described again.

According to the base station provided in this embodiment of the present invention, the target base station can determine whether to perform a core network relocation process and select the target core network. Therefore, determining accuracy is high. In this way, configuration information of base stations is exchanged in the handover process, thereby efficiently completing the handover process of the UE.

Figure 8:
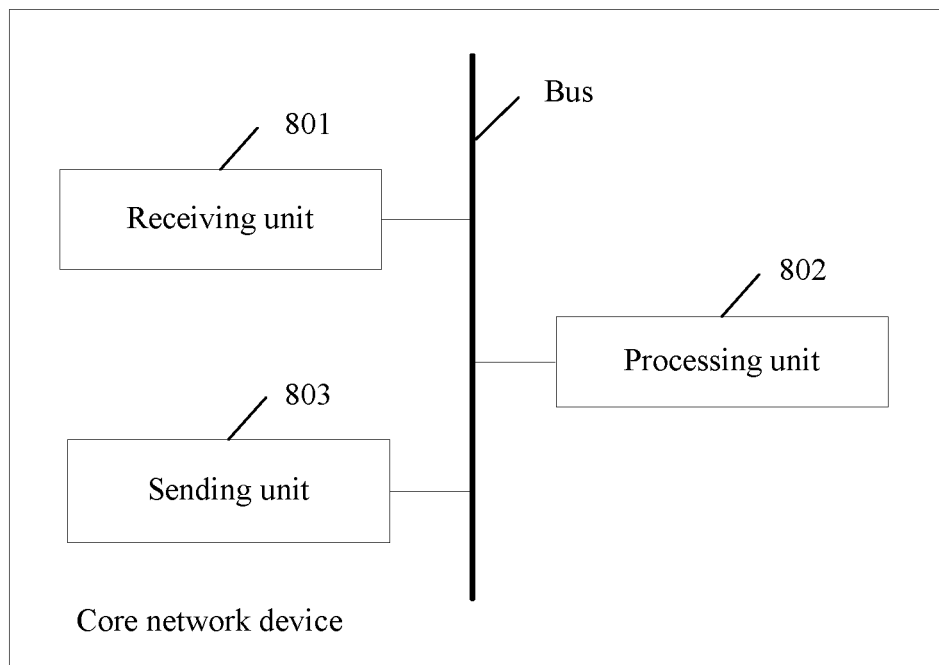
FIG. 8 is a schematic structural diagram of a core network device according to an embodiment of the present invention.

FIG. 8 is a schematic structural diagram of a core network device according to an embodiment of the present invention.

The core network device is connected to both a source base station and a target base station. The target base station is further connected to a target core network device, and UE determines to be handed over from the source base station to the target base station.

The core network device includes: a receiving unit 801, configured to receive a handover required message from the source base station, where the handover required message includes identification information of the target core network device, and the handover required message is used to instruct the source core network device to perform a core network relocation process with the target core network device, a processing unit 802 configured to determine the target core network device based on the handover required message, and a sending unit 803 configured to send a forward relocation request message to the target core network device, where the forward relocation request message is used to instruct the target core network device to create a bearer resource for the UE.

Specifically, a target core network that receives the forward relocation request message sends a relocation request message to the target base station, to instruct the target base station to reserve a resource for the UE.

The core network device may perform steps performed by the source core network device in the embodiments shown in FIG. 2 and FIG. 3. For specific function descriptions of the functional modules, refer to corresponding steps in the method embodiments. Details are not described herein again.

In another embodiment of the present invention, in terms of hardware implementation, the functions of the receiving unit 801 may be performed by a receiver, the functions of the processing unit 802 may be performed by a processor, and the functions of the sending unit 803 may be performed by a transmitter. The processing unit 802 may be integrated into or separate from the processor of the base station in a form of hardware, or may be stored in a memory of the base station in a form of software, so that the processor can invoke and perform operations corresponding to the foregoing modules.

Figure 9:
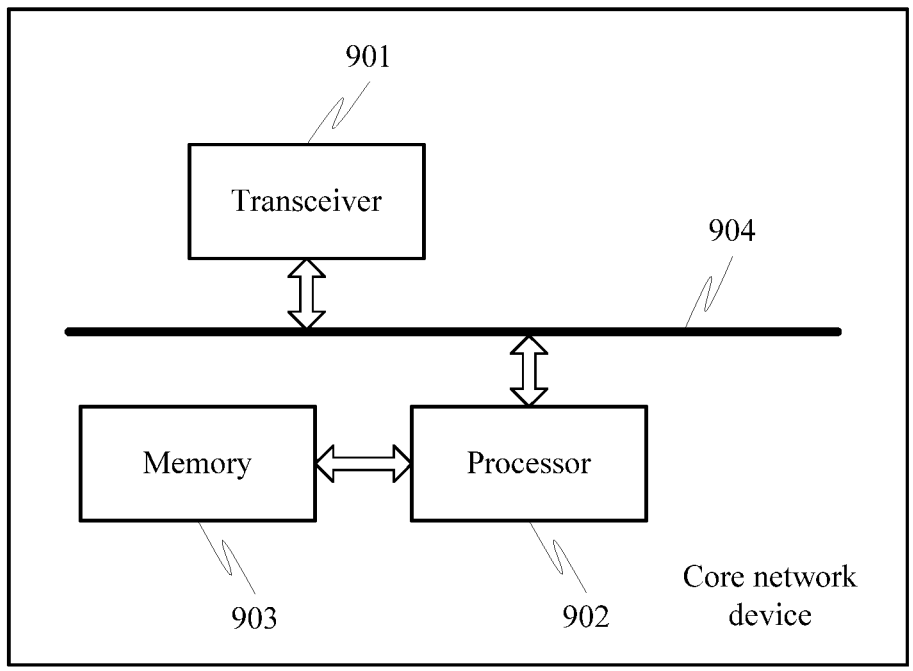
FIG. 9 is a schematic diagram of a structural design of a core network device according to an embodiment of the present invention.

FIG. 9 is a simplified schematic diagram of a possible design structure of a core network device according to an embodiment of the present invention.

As shown in FIG. 9, the core network device may include a transceiver 901 and a processor 902. The figure further shows a memory 903 and a bus 904. The transceiver 901, the processor 902, and the memory 903 are connected through the bus 904 and complete communication with each other.

The transceiver 901 may be a communications interface. The communications interface may be directly or indirectly connected to a communications interface corresponding to an access network device, and is configured to exchange information between an access network and a core network.

The processor 902 may be configured to perform a processing process of the core network device in the method embodiments shown in FIG. 2 to FIG. 5 and/or another process of the technology described in this application.

The memory 903 is configured to store executable program code or data, where the program code includes a computer operation instruction. The program code stored in the memory 903 may be executed by the processor 902.

For descriptions of a method process performed by the core network device in this embodiment and specific functions of the apparatuses and components in the device, refer to related content in other embodiments of the present invention. Details are not described herein again.

This embodiment of the present invention does not specially limit a specific type of the core network device, and the core network device may be an MME or any combination of a plurality of core network devices.

Figure 10:
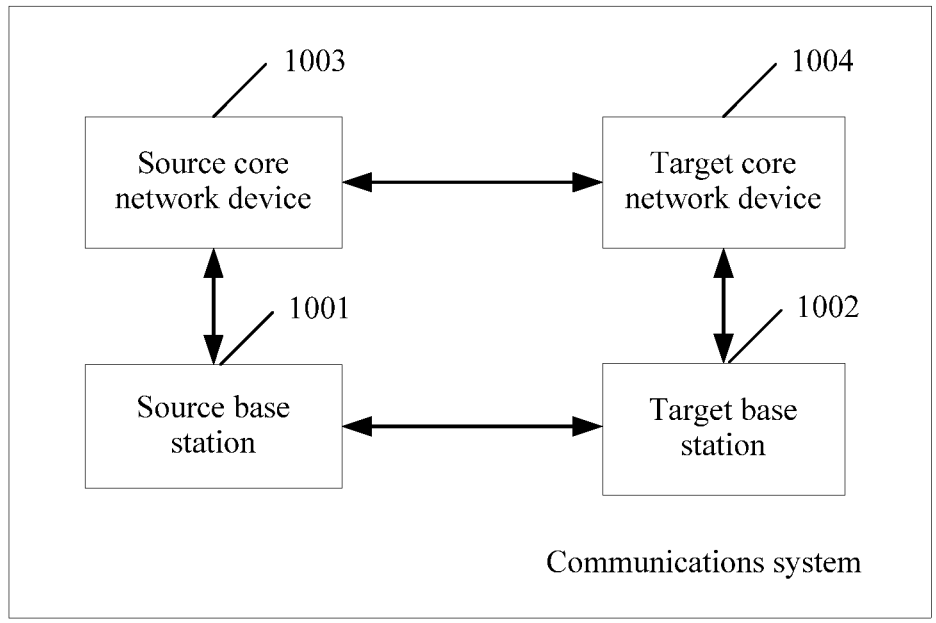
FIG. 10 is a schematic diagram of a communications system according to an embodiment of the present invention.

FIG. 10 is a schematic diagram of a communications system according to an embodiment of the present invention. The communications system includes a source base station 1001, a target base station 1002, a source core network device 1003, and a target core network device 1004.

As shown in FIG. 10, the source base station 1001 is connected to the source core network device 1003, and the target base station is connected to both the source core network device 1003 and the target core network device 1004. In addition, a communications interface may exist between the source base station 1001 and the target base station 1002.

For detailed descriptions of the functions of the devices in the communications system and the steps performed by the devices, refer to related content in other embodiments of the present invention. For example, the source base station 1001 may be the base station shown in FIG. 4 or FIG. 5 and may perform the steps performed by the source base station or the LTE eNB in the embodiments shown in FIG. 2 and FIG. 3. The target base station 1002 may be the base station shown in FIG. 6 and may perform the steps performed by the target base station or the eLTE eNB in the embodiments shown in FIG. 2 and FIG. 3. Details are not described herein again.

According to the communications system provided in this embodiment of the present invention, the source base station sends a handover required message to the source core network device after determining to hand the UE over to the target base station, where the handover required message includes identification information of the target core network device, the handover required message is used to instruct the source core network device to perform a core network relocation process with the target core network device, and the target base station supports both a source core network and a target core network. The identification information of the target core network device is carried in the handover required message, so that the source core network device can accurately identify the target core network device, thereby completing core network relocation and improving handover efficiency.

This application further provides the following embodiments:

Embodiment 1: A handover method, including: determining, by a source base station, to hand user equipment UE over to a target base station, where the source base station is connected to a source core network device, and the target base station is connected to both the source core network device and a target core network device, and sending, by the source base station, a handover required message to the source core network device, where the handover required message includes identification information of the target core network device, and the handover required message is used to instruct the source core network device to perform a core network relocation process with the target core network device.

Embodiment 2: The method according to Embodiment 1, further including: obtaining, by the source base station, configuration information of the target base station from the target base station, where the configuration information includes identification information of a core network device connected to the target base station and/or information indicating presence of a connection from the target base station to the core network device.

Embodiment 3: The method according to Embodiment 2, where the identification information of the target core network device includes identification information of a target core network and/or connection indication information, and the connection indication information is used to indicate presence of a connection from the target base station to the target core network.

Embodiment 4: The method according to Embodiment 2, where the configuration information further includes a location area identifier allocated to the target base station by the core network device connected to the target base station.

Embodiment 5: The method according to Embodiment 4, where the identification information of the target core network device includes any one or a combination of a plurality of the following information: identification information of a target core network, connection indication information, and a location area identifier allocated to the target base station by the target core network device, and the connection indication information is used to indicate presence of a connection from the target base station to the target core network.

Embodiment 6: The method according to any one of Embodiments 1 to 5, further including obtaining, by the source base station, capability information of the UE, where the capability information of the UE is used to indicate that the UE supports both services of a RAT of the source base station and services of a RAT of the target base station; and determining, by the source base station based on the capability information of the UE and the configuration information of the target base station, that the source core network device is to perform a core network relocation process with the target core network device.

Embodiment 7: The method according to any one of Embodiments 1 to 5, further including sending, by the source base station, an interface handover request message to the target base station, where the interface handover request message includes capability information of the UE, so that the target base station determines, based on the capability information of the UE and the configuration information of the target base station, that the source core network device is to perform a core network relocation process with the target core network device, where the capability information of the UE is used to indicate that the UE supports both services of a RAT of the source base station and services of a RAT of the target base station, and receiving, by the source base station, an interface handover request response message from the target base station, where the interface handover request response message includes the configuration information of the target base station, and the interface handover request response message is used to instruct the source base station to send the handover required message to the source core network device.

Embodiment 8: The method according to any one of Embodiments 1 to 5, where the obtaining, by the source base station, configuration information of the target base station from the target base station includes sending, by the source base station, an interface connection setup request message to the target base station; and receiving, by the source base station, an interface connection setup response message from the target base station, where the connection setup response message includes the configuration information of the target base station.

Embodiment 9: The method according to any one of Embodiments 1 to 5, where the obtaining, by the source base station, configuration information of the target base station from the target base station includes receiving, by the source base station, a base station configuration update message from the target base station, where the base station configuration update message includes updated configuration information of the target base station.

Embodiment 10: A base station, including: a processing unit, configured to determine to hand user equipment UE over to a target base station, where the source base station is connected to a source core network device, and the target base station is connected to both the source core network device and a target core network device; and a first sending unit, configured to send a handover required message to the source core network device, where the handover required message includes identification information of the target core network device, and the handover required message is used to instruct the source core network device to perform a core network relocation process with the target core network device.

Embodiment 11: The base station according to Embodiment 10, further including a first obtaining unit, configured to obtain configuration information of the target base station from the target base station, where the configuration information includes identification information of a core network device connected to the target base station and/or information indicating presence of a connection from the target base station to the core network device.

Embodiment 12: The base station according to Embodiment 11, where the identification information of the target core network device includes identification information of a target core network and/or connection indication information, and the connection indication information is used to indicate presence of a connection from the target base station to the target core network.

Embodiment 13: The base station according to Embodiment 11, where the configuration information further includes a location area identifier allocated to the target base station by the core network device connected to the target base station.

Embodiment 14: The base station according to Embodiment 13, where the identification information of the target core network device includes any one or a combination of a plurality of the following information: identification information of a target core network, connection indication information, and a location area identifier allocated to the target base station by the target core network device, and the connection indication information is used to indicate presence of a connection from the target base station to the target core network.

Embodiment 15: The base station according to any one of Embodiments 10 to 14, further including a second obtaining unit, configured to obtain capability information of the UE, where the capability information of the UE is used to indicate that the UE supports both services of a RAT of the source base station and services of a RAT of the target base station, where the processing unit is further configured to determine, based on the capability information of the UE and the configuration information of the target base station, that the source core network device is to perform a core network relocation process with the target core network device.

Embodiment 16: The base station according to any one of Embodiments 10 to 14, further including a second sending unit, configured to send an interface handover request message to the target base station, where the interface handover request message includes capability information of the UE, so that the target base station determines, based on the capability information of the UE and the configuration information of the target base station, that the source core network device is to perform a core network relocation process with the target core network device, where the capability information of the UE is used to indicate that the UE supports both services of a RAT of the source base station and services of a RAT of the target base station, and the first obtaining unit is specifically configured to receive an interface handover request response message from the target base station, where the interface handover request response message includes the configuration information of the target base station, and the interface handover request response message is used to instruct the source base station to send the handover required message to the source core network device.

Embodiment 17: The base station according to any one of Embodiments 10 to 14, further including a second sending unit, configured to send an interface connection setup request message to the target base station, where the first obtaining unit is specifically configured to receive an interface connection setup response message from the target base station, where the connection setup response message includes the configuration information of the target base station.

Embodiment 18: The base station according to any one of Embodiments 10 to 14, where the first obtaining unit is specifically configured to receive a base station configuration update message from the target base station, where the base station configuration update message includes updated configuration information of the target base station.

It may be understood that the processor used in the base station or the core network device in the embodiments of the present invention may be a central processing unit (CPU), a general-purpose processor, a digital signal processor (DSP), an application-specific integrated circuit (ASIC), a field programmable gate array (FPGA) or another programmable logic device, a transistor logic device, a hardware component, or a combination thereof. The processor may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor.

The bus in the embodiments of the present invention may be an industry standard architecture (ISA) bus, a Peripheral Component Interconnect (PCI) bus, an extended industry standard architecture (EISA) bus, or the like. The bus may be classified into an address bus, a data bus, a control bus, and the like. For ease of representation, a bus in the accompanying drawings of the present invention is represented by using only one bold line. However, this does not indicate that there is only one bus or one type of bus.

A person skilled in the art may clearly know that mutual reference may be made between descriptions of the embodiments provided in the present invention. For ease of description and brevity, for example, for the functions of the apparatuses and devices provided in the embodiments of the present invention and the steps performed by the apparatuses and the devices, refer to related descriptions in the method embodiments of the present invention.

Method or algorithm steps described with reference to the content disclosed in the present invention may be implemented by hardware, or may be implemented by a processor by executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium and write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

In the several embodiments provided in this application, it should be understood that the disclosed system, device, and method may be implemented in other manners without departing from the scope of this application. For example, the described embodiments are merely examples. For example, the module or unit division is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, and may be located in one position or distributed on a plurality of network units. Some or all the modules may be selected based on actual needs to achieve the objectives of the solutions of the embodiments. A person of ordinary skill in the art may understand and implement the embodiments of the present invention without creative efforts.

Moreover, the described systems, devices, methods, and schematic diagrams of different embodiments may be combined with or integrated into another system, module, technology, or method without departing from the scope of this application. In addition, the displayed or discussed mutual couplings or direct couplings or communication connections may be indirect couplings or communication connections through some interfaces, apparatuses or units, and may be implemented in electronic, mechanical, or other forms.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A handover method, comprising:
   determining, by a source base station, according to capability information of a user equipment (UE) and further according to configuration information of a target base station, that a source core network device is to perform a core network relocation process with a target core network device, wherein the capability information of the UE indicates that the UE supports both services of a radio access technology (RAT) of the source base station and services of a RAT of the target base station;
   sending, by the source base station to the source core network device in a process of handing the UE over from the source base station to the target base station, a handover required message, wherein the handover required message comprises identification information of the target core network device, and wherein the identification information of the target core network device instructs the source core network device to perform the core network relocation process with the target core network device; and
   sending, by the source base station, a handover instruction to the UE, wherein the handover instruction carries type information of a target core network, wherein the type information of the target core network comprises at least one of an explicit indication of a network type of the target core network or an implicit indication of whether the network type of the target core network is different than a type of a source core network;
   wherein the source base station is connected to the source core network device, and wherein the target base station is connected to both the source core network device and the target core network device.

2. The method according to claim 1, wherein the type information of the target core network indicates that, after being handed over to the target base station, the user equipment needs to use a non-access stratum (NAS) corresponding to the target core network to perform subsequent processes.

3. The method according to claim 1, further comprising:
   receiving, by the source base station, a message intended for handover sent by the source core network, wherein the message intended for handover carries the handover instruction.

4. The method according claim 1, wherein the type information of the target core network comprises at least one of: a type of the target core network, a non-access stratum (NAS) for use after the process of handing the UE over from the source base station to the target base station, or a bit indicating whether to change an NAS in current use.

5. The method according to claim 1, wherein the handover instruction is a radio resource control message, and wherein the radio resource control message carries the type information of the target core network.

6. A handover method, comprising:
   receiving, by a user equipment (UE) which is being handed over from a source base station to a target base station, from the source base station, a handover instruction, wherein the handover instruction carries type information of a target core network, wherein the type information of the target core network comprises at least one of an explicit indication of a network type of the target core network or an implicit indication of whether the network type of the target core network is different than a type of a source core network; and
   sending, by the user equipment, capability information of the UE, wherein the capability information of the UE indicates that the UE supports both services of a radio access technology (RAT) of the source base station and services of a RAT of the target base station, and wherein a source core network device is determined by the source base station to perform a core network relocation process with a target core network device based on the capability information and configuration information of the target base station;
   wherein the source base station is connected to the source core network device, and wherein the target base station is connected to both the source core network device and the target core network device.

7. The method according to claim 6, wherein the type information of the target core network indicates that, after being handed over from the source base station to the target base station, the user equipment needs to use a non-access stratum (NAS) corresponding to the target core network to perform subsequent processes.

8. The method according claim 6, wherein the type information of the target core network comprises at least one of: a type of the target core network, a non-access stratum (NAS) for use after the UE being handed over from the source base station to the target base station, or a bit indication indicating whether to change an NAS in current use.

9. The method according to claim 6, wherein the handover instruction is a radio resource control message, and wherein the radio resource control message carries the type information of the target core network.

10. A base station, comprising:
a base station, comprising:
at least one processor; and
a memory storing instructions for execution by the at least one processor, wherein, when executed, the instructions cause the base station to perform operations comprising:
determining, according to capability information of a user equipment (UE) and further according to configuration information of a target base station, that a source core network device is to perform a core network relocation process with a target core network device, wherein the capability information of the UE indicates that the UE supports both services of a radio access technology (RAT) of the base station and services of a RAT of the target base station;
sending, to the source core network device in a process of handing the UE over from the base station to the target base station, a handover required message, wherein the handover required message comprises identification information of the target core network device, and wherein the identification information of the target core network device instructs the source core network device to perform the core network relocation process with the target core network device; and
sending, a handover instruction to the UE, wherein the handover instruction carries type information of a target core network, wherein the type information of the target core network comprises at least one of an explicit indication of a network type of the target core network or an implicit indication of whether the network type of the target core network is different than a type of a source core network;
wherein the base station is connected to the source core network device, and wherein the target base station is connected to both the source core network device and the target core network device.

11. The base station according to claim 10, wherein the type information of the target core network indicates that, after the process of handing the UE over from the base station to the target base station, the user equipment needs to use a non-access stratum (NAS) corresponding to the target core network to perform subsequent processes.

12. The base station according to claim 10, wherein, when executed, the instructions further cause the base station to perform operations comprising:

receiving, a message intended for handover sent by the source core network, wherein the message intended for handover carries the handover instruction.

13. The base station according claim 10, wherein the type information of the target core network comprises at least one of: a type of the target core network, a non-access stratum (NAS) for use after the process of handing the UE over from the base station to the target base station, or a bit indicating whether to change an NAS in current use.

14. The base station according to claim 10, wherein the handover instruction is a radio resource control message, and wherein the radio resource control message carries the type information of the target core network.

15. A system, comprising:
a user equipment (UE), comprising
at least one first processor; and
a first memory storing first instructions for execution by the at least one first processor, wherein, when executed, the first instructions cause the UE to perform operations comprising:
receiving, from a source base station, a handover instruction, wherein the handover instruction carries type information of a target core network, wherein the type information of the target core network comprises at least one of an explicit indication of a network type of the target core network or an implicit indication of whether the network type of the target core network is different than a type of a source core network; and
sending, by the user equipment, capability information of the UE, wherein the capability information of the UE indicates that the UE supports both services of a radio access technology (RAT) of the source base station and services of a RAT of a target base station;
the source base station, comprising:
at least one second processor; and
a second memory storing second instructions for execution by the at least one second processor, wherein, when executed, the second instructions cause the source base station to perform operations comprising:
determining a source core network device to perform a core network relocation process with a target core network device based on the capability information and configuration information of the target base station;
wherein the receiving is performed in relation to a handover from the source base station to the target base station; and
wherein the source base station is connected to the source core network device, and wherein the target base station is connected to both the source core network device and the target core network device.

16. The system according to claim 15, wherein the type information of the target core network indicates that, after being handed over to the target base station, the user equipment needs to use a non-access stratum (NAS) corresponding to the target core network to perform subsequent processes.

17. The system according claim 15, wherein the type information of the target core network comprises at least one of: a type of the target core network, a non-access stratum (NAS) for use after the handover, or a bit indicating whether to change a non-access stratum (NAS) in current use.

18. The system according to claim 15, wherein the handover instruction is a radio resource control message, and wherein the radio resource control message carries the type information of the target core network.

* * * * *